US008872821B2

(12) United States Patent
Adachi et al.

(10) Patent No.: US 8,872,821 B2
(45) Date of Patent: Oct. 28, 2014

(54) INFORMATION DISPLAY DEVICE AND DISPLAY IMAGE CONTROL METHOD

(75) Inventors: Hiroaki Adachi, Tokyo (JP); Katsutoshi Sakao, Kanagawa (JP); Atsushi Koshiyama, Tokyo (JP); Haruo Oba, Kanagawa (JP)

(73) Assignee: Sony Corporation (JP)

( * ) Notice: Subject to any disclaimer, the term of this patent is extended or adjusted under 35 U.S.C. 154(b) by 261 days.

(21) Appl. No.: 13/149,034

(22) Filed: May 31, 2011

(65) Prior Publication Data

US 2011/0298791 A1 Dec. 8, 2011

(30) Foreign Application Priority Data

Jun. 7, 2010 (JP) ................ P2010-129577

(51) Int. Cl.
| | |
|---|---|
| *G06T 17/00* | (2006.01) |
| *G06T 15/40* | (2011.01) |
| *H04N 13/00* | (2006.01) |
| *G06F 3/0488* | (2013.01) |
| *G06F 3/0482* | (2013.01) |
| *H04N 13/04* | (2006.01) |
| *G06F 3/044* | (2006.01) |

(52) U.S. Cl.
CPC ............ *H04N 13/007* (2013.01); *G06F 3/0488* (2013.01); *G06F 2203/04101* (2013.01); *G06F 3/0482* (2013.01); *H04N 13/0497* (2013.01); *G06F 3/044* (2013.01); *H04N 13/003* (2013.01)
USPC ............................. 345/420; 345/422; 348/42

(58) Field of Classification Search
CPC ....... G06T 15/00; G06T 15/40; G06F 3/0488; G06F 3/044; G06F 3/0482; G06F 2203/04101; H04N 13/0497; H04N 13/007; H04N 13/0003
USPC ................. 345/501, 156, 157, 158, 159, 122, 345/173–175, 419–422; 359/463; 715/863; 348/42–60
See application file for complete search history.

(56) References Cited

U.S. PATENT DOCUMENTS

| 6,373,265 B1 * | 4/2002 | Morimoto et al. ............ 324/686 |
| 7,782,299 B2 * | 8/2010 | Ogino ........................... 345/158 |

(Continued)

FOREIGN PATENT DOCUMENTS

| JP | 10260774 | 9/1998 |
| JP | 2004280496 A | 10/2004 |

(Continued)

OTHER PUBLICATIONS

Colin Ware and Kathy Lowther:"Selection using a one-eyed cursor in a fish tank VR environment", Dec. 1997, ACM.*

(Continued)

*Primary Examiner* — Ryan R Yang
*Assistant Examiner* — Michael Le
(74) *Attorney, Agent, or Firm* — Lerner, David, Littenberg, Krumholz & Mentlik, LLP

(57) ABSTRACT

Disclosed herein is an information display device, including: an image display section adapted to display binocular parallax images; a display image control section adapted to control the binocular parallax images displayed on the image display section; and a position information acquisition section adapted to acquire position information representing the three-dimensional position of a target existing in the three-dimensional space on the display surface of the image display section, wherein the display image control section controls the binocular parallax images displayed on the image display section according to the three-dimensional position of the target represented by the position information acquired by the position information acquisition section.

8 Claims, 29 Drawing Sheets

(56) References Cited

U.S. PATENT DOCUMENTS

| | | | |
|---|---|---|---|
| 2004/0240777 A1* | 12/2004 | Woodgate et al. | 385/16 |
| 2004/0242988 A1* | 12/2004 | Niwa et al. | 600/407 |
| 2005/0219239 A1* | 10/2005 | Mashitani et al. | 345/419 |
| 2009/0073556 A1* | 3/2009 | Bent-Gourley | 359/463 |

FOREIGN PATENT DOCUMENTS

| | | |
|---|---|---|
| JP | 2005275644 A | 10/2005 |
| JP | 2005280396 A | 10/2005 |
| JP | 2008059148 A | 3/2008 |
| JP | 2008257216 A | 10/2008 |
| JP | 2010092420 A | 4/2010 |
| WO | 2004114108 A1 | 12/2004 |

OTHER PUBLICATIONS

Office Action from Japanese Application No. 2010-129577, dated Dec. 17, 2013.

* cited by examiner

RELATIONSHIP BETWEEN SENSOR-TO-SENSOR DISTANCE
AND DETECTION LEVEL OF EACH ELECTRODE

SENSOR-TO-SENSOR DISTANCE
IS LARGE

SENSOR-TO-SENSOR DISTANCE
IS INTERMEDIATE

SENSOR-TO-SENSOR DISTANCE
IS ZERO, CONTACTED

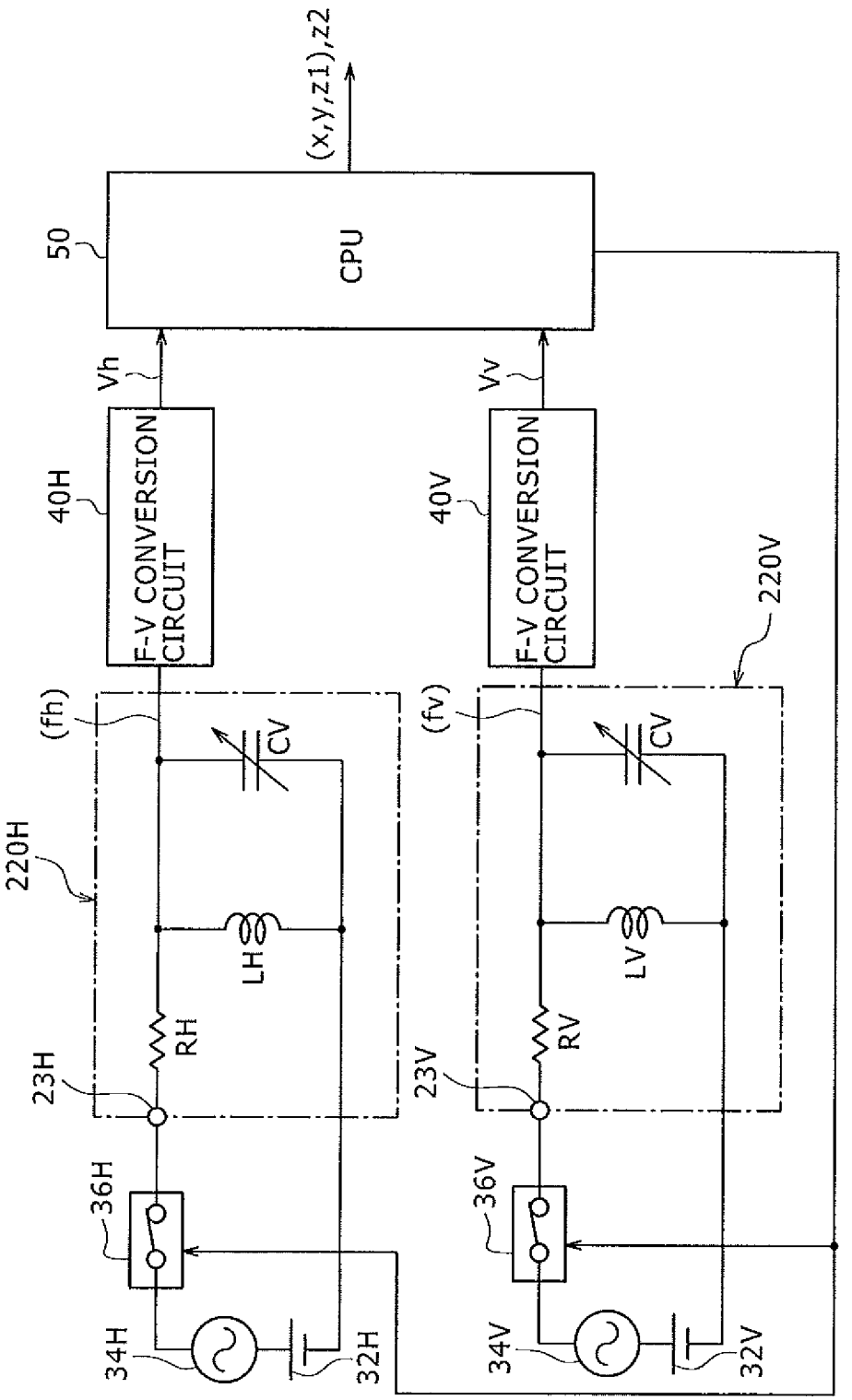

IMAGE 2

IMAGE LIST

| IMAGE 1-1 | |
|---|---|
| HOLD YOUR HAND OVER | |

FIG.14A

IMAGE 2-1
- PRODUCT 1
- PRODUCT 2
- PRODUCT 3

FIG.14B

IMAGE 3-1
- PRODUCT 1
- PRODUCT 2
- PRODUCT 3

FIG.14C

IMAGE 3-2
- PRODUCT 1
- PRODUCT 2
- PRODUCT 3

FIG.14D

IMAGE 3-3
- PRODUCT 1
- PRODUCT 2
- PRODUCT 3

FIG.14E

IMAGE 4-1
- PRODUCT 1
- PRODUCT 2
- PRODUCT 3

FIG.14F

IMAGE 4-2
- PRODUCT 1
- PRODUCT 2
- PRODUCT 3

FIG.14G

IMAGE 4-3
- PRODUCT 1
- PRODUCT 2
- PRODUCT 3

SET ACTION FOR EACH CONDITION

| SCENE | CONDITION | ACTION |
|---|---|---|
| (1) | USER APPROACHES (OTHER THAN BELOW) | DISPLAY IMAGE 1-1 |
| (2) | $Z2<300$ | DISPLAY IMAGE 2-1 |
| (3) | $Z2<150$ AND $20 \leq x \leq 80$ AND $0 \leq y \leq 30$ | DISPLAY IMAGE 3-1 |
| | $Z2<150$ AND $20 \leq x \leq 80$ AND $35 \leq y \leq 65$ | DISPLAY IMAGE 3-2 |
| | $Z2<150$ AND $20 \leq x \leq 80$ AND $70 \leq y \leq 100$ | DISPLAY IMAGE 3-3 |
| (4) | $Z2=0$ AND $20 \leq x \leq 80$ AND $0 \leq y \leq 30$ | DISPLAY IMAGE 4-1 |
| | $Z2=0$ AND $20 \leq x \leq 80$ AND $35 \leq y \leq 65$ | DISPLAY IMAGE 4-2 |
| | $Z2=0$ AND $20 \leq x \leq 80$ AND $70 \leq y \leq 100$ | DISPLAY IMAGE 4-3 |

IMAGE 1

IMAGE 1

IMAGE 2

IMAGE 2

IMAGE 3

INFORMATION DISPLAY DEVICE AND DISPLAY IMAGE CONTROL METHOD

BACKGROUND OF THE INVENTION

The present disclosure relates to an information display device and display image control method, and more particularly, to an information display device, etc., having an image display section adapted to display binocular parallax images.

Flat information display devices having a transparent touch panel on the display surface and using, for example, liquid crystal display elements have been described in Japanese Patent Laid-Open No. 2005-275644 (as Patent Document 1). In the case of such an information display device, the user can perform an operation, for example, by selecting the option for that operation from the menu shown on the display surface.

In the case of an information display device adapted to be operated with a touch panel, the user needs to directly touch the display surface, for example, with a finger for operation. For example, therefore, if the hand is dirty, the user cannot operate the device, or at least hesitates to do so.

For example, Japanese Patent Laid-Open No. 2005-280396 (as Patent Document 2) describes an operation instruction device that detects the three-dimensional position of the user's finger and allows for the user to operate the device without touching the display surface with a finger or other object. In this case, a target space is established between the user's viewpoint position and the display device located at the distance determined by bearing in mind the length of the user's hand. Icons displayed on the display device are selected as the user moves his or her finger into the target space.

SUMMARY OF THE INVENTION

In the case of the information display device described in Patent Document 2, the icons are two-dimensionally displayed. That is, the icons are displayed on the display surface of the display device. The user has difficulties in verifying whether he or she is pointing to the intended icon because the displayed icons and the target space for the icons are far from each other.

It is an aim of the present disclosure to provide improved ease of use for the user which includes improved user operation accuracy and effectively supplying information to the user.

The concept of the present disclosure lies in an information display device that includes an image display section, a display image control section and a position information acquisition section. The image display section displays binocular parallax images. The display image control section controls the binocular parallax images displayed on the image display section. The position information acquisition section acquires position information representing the three-dimensional position of a target existing in the three-dimensional space on the display surface of the image display section. The display image control section controls the binocular parallax images displayed on the image display section according to the three-dimensional position of the target represented by the position information acquired by the position information acquisition section.

In the present disclosure, binocular parallax images (left and right eye images) are displayed on the image display section. Then, the binocular parallax images displayed on the image display section are controlled by the display image control section. This control of the binocular parallax images includes, for example, controlling the content of the images and controlling the parallax between the left and right eye images. The user can visually perceive a stereoscopic image as the binocular parallax images are displayed on the image display section. It should be noted that a stereoscopic image may be displayed by using an eyeglass method (e.g., shutter glass method, polarized glass method) or a naked eye method (e.g., lenticular method, parallax barrier method).

The position information acquisition section acquires position information representing the three-dimensional position of a target existing in the three-dimensional space on the display surface of the image display section. The position information acquisition section may include an electrostatic capacitance sensor and position detection/processing section. The electrostatic capacitance sensor has a plurality of electrodes that are placed, for example, on the display surface of the image display section and that can serve as detection electrodes used to detect the three-dimensional position of a target. The position detection/processing section detects the three-dimensional position of the target based on the values obtained by the plurality of electrodes.

The target whose position information is to be acquired is, for example, a body part of the user adapted to make a predetermined movement that is located in the three-dimensional space on the display surface of the image display section. Here, the term "predetermined movement" refers to a movement relating to the stereoscopic image visually perceived by the user. For example, if the user visually perceives, as a stereoscopic image, predetermined information for selecting the products in a vending machine (e.g., product selection buttons), the predetermined action is an action adapted to select a product. Further, for example, if the user visually perceives, as a stereoscopic image, predetermined information for operating a television receiver (e.g., channel selection buttons), the predetermined action is an action adapted to select a channel of the television receiver. Still further, for example, if the user visually perceives, as a stereoscopic image, predetermined information for public relations such as a product or character, the predetermined action is an action adapted to stretch out his or her hand on which to place the product or character.

The display image control section controls the binocular parallax images displayed on the image display section according to the three-dimensional position of the target represented by the position information acquired by the position information acquisition section. In this case, the type of stereoscopic image visually perceived by the user and the position where the image is visually perceived change according to the three-dimensional position of the target. For example, we assume that the user visually perceives, as a stereoscopic image, predetermined information for selecting the products in a vending machine (e.g., product selection buttons). In this case, when the user's hand enters the set zone for selecting a product selection button, the manner in which the product selection button appears (e.g., color, size or position where it is visually perceived) changes, indicating that the product is being selected.

Further, for example, we assume that the user visually perceives, as a stereoscopic image, predetermined information for operating a television receiver (e.g., channel selection buttons). In this case, when the user's hand approaches the visual perception position for a channel selection button, the manner in which the channel selection button appears (e.g., color, size and position where it is visually perceived) changes, indicating that the channel is being selected. Still further, for example, we assume that the user visually perceives, as a stereoscopic image, predetermined information for public relations such as a product or character. In this case, when the user's hand approaches the display surface, the manner in which the product or character appears changes, allowing it to be visually perceived on the user's hand.

As described above, the binocular parallax images displayed on the image display section are controlled according to the three-dimensional position of the target in the present disclosure. This provides improved user operation accuracy or effectively supplies information to the user, thus contributing to improved ease of use for the user.

In the present disclosure, for example, the position information acquisition section may further acquire information about the distance between the display surface of the image display section and the user, and the display image control section may further control the binocular parallax images displayed on the image display section according to the distance acquired by the position information acquisition section.

Even if the binocular parallax images displayed on the image display section are the same, the position where the stereoscopic image is visually perceived by the user changes according to the distance between the display surface of the image display section and the user. By controlling the binocular parallax images displayed on the image display section according to the distance, it is possible, for example, to maintain the stereoscopic image visually perceived by the user at the same position irrespective of the distance. Further, by controlling the binocular parallax images displayed on the image display section according to the distance, it is possible to display the binocular parallax images on the image display section if the user approaches the display surface closer than a given distance.

Further, in the present disclosure, the image display section may be, for example, provided on the outer enclosure of a vending machine and display at least binocular parallax images that allow predetermined product selection information to be visually perceived as a stereoscopic image. The image display section may further include a system control section adapted to control the operation of the vending machine according to the three-dimensional position of the target represented by the position information acquired by the position information acquisition section.

Still further, in the present disclosure, the image display section may make up a digital signage device and display at least binocular parallax images that allow predetermined public relations information to be visually perceived as a stereoscopic image.

Still further, the image display section may make up a television receiver and display at least binocular parallax images that allow predetermined information for operating the television receiver to be visually perceived as a stereoscopic image. The image display section may further include a system control section adapted to control the operation of the television receiver according to the three-dimensional position of the target represented by the position information acquired by the position information acquisition section.

The another concept of the present disclosure lies in a display image control method for controlling binocular parallax images displayed on an image display section adapted to display binocular parallax images that includes: acquiring position information representing the three-dimensional position of a target existing in the three-dimensional space on the display surface of the image display section; and controlling binocular parallax images displayed on the image display section according to the three-dimensional position of the target represented by the position information acquired by the position information acquisition step.

The present disclosure controls the binocular parallax images on the image display section according to the three-dimensional position of a target existing in the three-dimensional space on the display surface of the image display section. This provides improved user operation accuracy or effectively supplies information to the user, thus contributing to improved ease of use for the user.

BRIEF DESCRIPTION OF THE DRAWINGS

FIG. 6 is a diagram schematically illustrating a configuration example of a position detection/processing section making up the position information acquisition section;

FIGS. 14A to 14H are diagrams illustrating a list of images displayed during different scenes of operation of the vending machine;

FIG. 15 is a diagram illustrating an example of a set action for each condition of the three-dimensional position (x, y, z2) of the finger tip acquired by the position detection/processing section;

DETAILED DESCRIPTION OF THE PREFERRED EMBODIMENTS

A description will be given below of the modes for carrying out the disclosure (hereinafter referred to as embodiments). It should be noted that the description will be given in the following order.

1. First embodiment
2. Second embodiment
3. Third embodiment
4. Modification example 1. First Embodiment

[Configuration Example of the Vending Machine]

Figure 1:
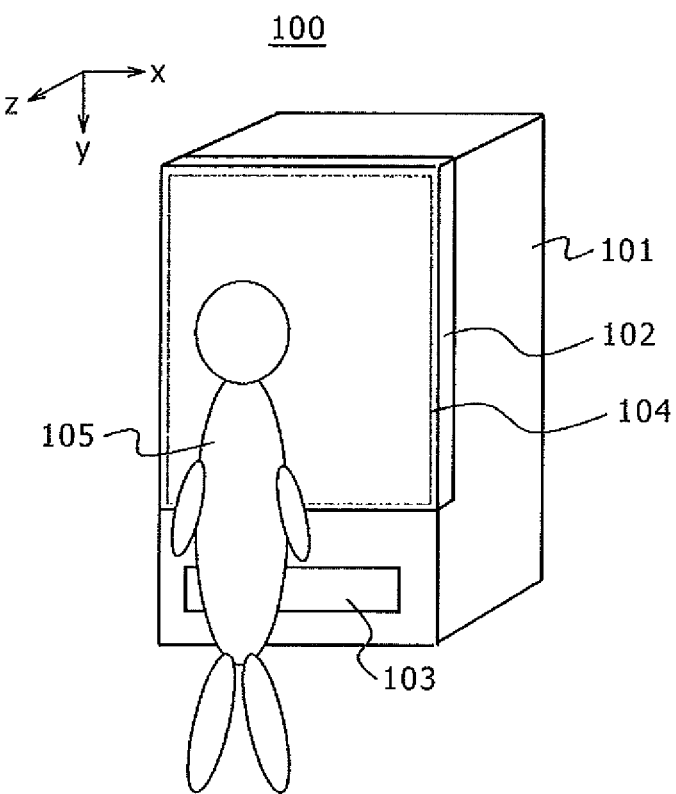
FIG. 1 is a diagram schematically illustrating the appearance of a vending machine as a first embodiment of the present disclosure.

FIG. 1 illustrates the appearance of a vending machine 100 as a first embodiment of the present disclosure. The vending machine 100 is formed in the shape of a rectangular parallelepiped as a whole. A flat display panel such as an LCD (Liquid Crystal Display) 102 is provided on the front side of an outer enclosure 101 of the vending machine 100. The LCD 102 makes up an image display section adapted to display binocular parallax images. Further, a dispensing chute 103 is provided at the bottom on the front side of the outer enclosure 101 of the vending machine 100.

An electrostatic capacitance sensor 104 is placed on the display surface of the LCD 102. The electrostatic capacitance sensor 104 makes up a position information acquisition section. The position information acquisition section acquires information representing the three-dimensional position (x, y, z2) of a target existing in the three-dimensional space on the display surface of the LCD 102. In the present embodiment, the target is the hand of a user 105. Further, the position information acquisition section acquires information about a distance z1 between the display surface of the LCD 102 and the user 105.

If the user 105 approaches the LCD 102 closer than a given distance, the LCD 102 displays binocular parallax images that allow predetermined product selection information such as product selection buttons to be visually perceived by the user 105. Next, when the hand of the user 105 enters the set zone for selecting a product selection button, the manner in which the product selection button appears (e.g., color, size and position where it is visually perceived) changes, indicating that the product is being selected. Then, when, with this product selected, the hand of the user 105 further approaches the LCD 102, the purchase of the selected product is decided, ejecting the product into the dispensing chute 103.

Figure 2:
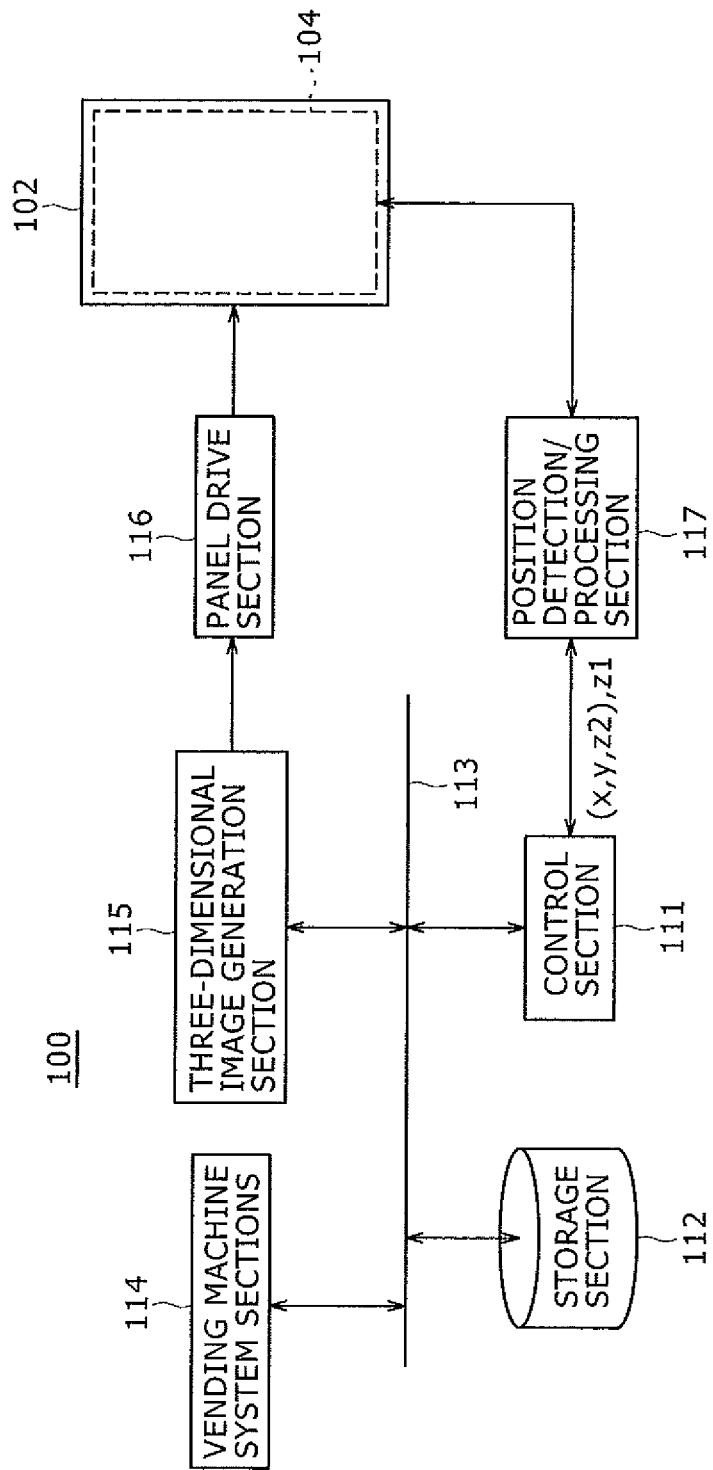
FIG. 2 is a block diagram illustrating an example of circuit configuration of the vending machine.

FIG. 2 illustrates an example of circuit configuration of the vending machine 100. The vending machine 100 includes a control section 111, a storage section 112, a bus 113, vending machine system sections 114, a three-dimensional image generation section 115, a panel drive section 116 and a position detection/processing section 117 in addition to the LCD 102 and the electrostatic capacitance sensor 104.

The control section 111 controls the operation of various sections of the vending machine 100. The storage section 112 stores in advance the operation program of the control section 111, image data used to generate binocular parallax images (left and right eye images) and other data. The three-dimensional image generation section 115 generates display image data used to display the binocular parallax images (left and right eye images) under control of the control section 111. The control section 111 is connected to the storage section 112 via the bus 113. Further, the control section 111 controls the operation of the vending machine system sections 114 and three-dimensional image generation section 115 via the bus 113.

The panel drive section 116 drives the LCD 102 based on the display image data generated by the three-dimensional image generation section 115, allowing the LCD 102 to display binocular parallax images that allow the user 105 to visually perceive a stereoscopic image. The position detection/processing section 117 makes up the position information acquisition section together with the electrostatic capacitance sensor 104. The position detection/processing section 117 outputs information about the three-dimensional position (x, y, z2) of the hand (target) of the user 105 existing in the three-dimensional space on the display surface of the LCD 102. Further, the position detection/processing section 117 outputs information about the distance z1 between the display surface of the LCD 102 and the user 105.

Here, a detailed description will be given of the position information acquisition section (electrostatic capacitance sensor 104 and position detection/processing section 117) adapted to acquire three-dimensional information about the target existing in the three-dimensional space on the display surface of the LCD 102. It should be noted that the position information acquisition section was proposed by the present applicants earlier, and that the following description will be made by referring to Japanese Patent Laid-Open No. 2008-11737.

Figure 3:
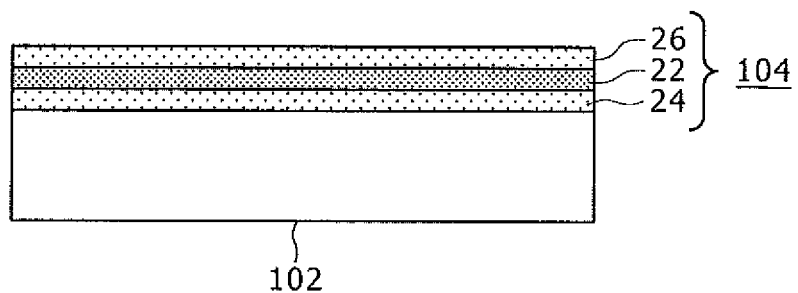
FIG. 3 is a diagram for describing a configuration example of an electrostatic capacitance sensor making up a position information acquisition section.
Figure 4:
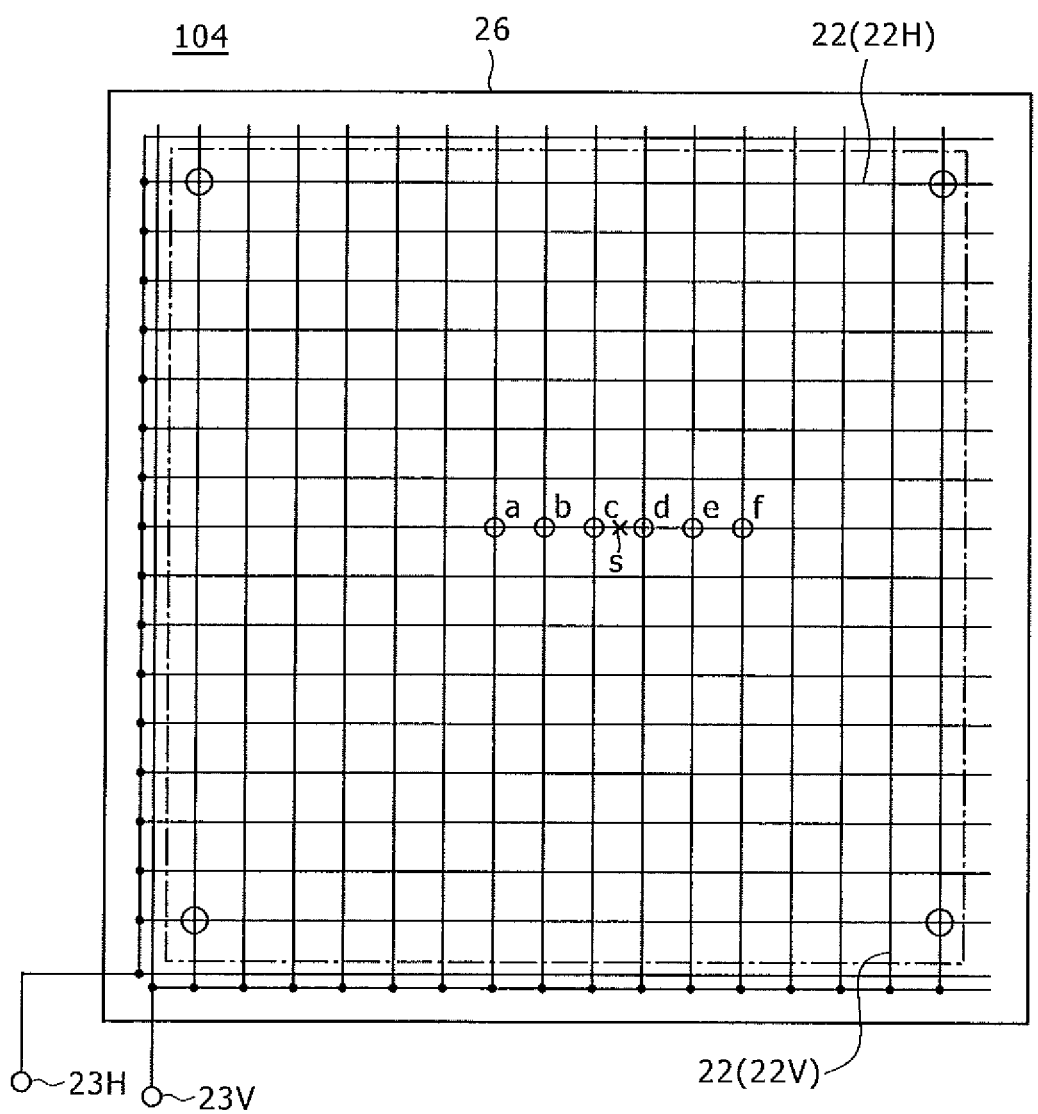
FIG. 4 is a diagram for describing a configuration example of the electrostatic capacitance sensor making up the position information acquisition section.

FIGS. 3 and 4 illustrate a configuration example of the electrostatic capacitance sensor 104. The same sensor 104 has a secondary electrode (detection electrode) 22 sandwiched between two thin and transparent glass plates (dielectrics) 26 and 24.

The secondary electrode 22 can be formed with a transparent wire electrode or transparent conductive layer. In this case, the secondary electrode 22 is formed with a wire electrode. This secondary electrode 22 has a plurality of horizontal electrodes (horizontal axis detection electrodes) 22H arranged horizontally in a large number at predetermined intervals as illustrated in FIG. 4. Further, this secondary electrode 22 has a plurality of vertical electrodes (vertical axis detection electrodes) 22V arranged vertically in a large number at predetermined intervals as illustrated in FIG. 4.

A common terminal 23H for the plurality of horizontal electrodes 22H and a common terminal 23V for the plurality of vertical electrodes 22V are led out from the glass plate 26. A predetermined high frequency signal for position detection is applied alternately to the common terminals 23H and 23V from the position detection/processing section 117 as described later.

The electrostatic capacitance sensor 104 serves not only as a touch sensor but also as a proximity detection sensor. When the finger tip, for example, is brought into contact with the surface of the electrostatic capacitance sensor 104, the electrostatic capacitances of the horizontal and vertical electrodes 22H and 22V at the contact point change. This makes it possible to identify the coordinates of the contact point. Further, when the target such as finger tip comes face-to-face with the surface of the electrostatic capacitance sensor 104 (two-dimensional plane), the electrostatic capacitances of the horizontal and vertical electrodes 22H and 22V at the face-to-face position change. This makes it possible to identify the coordinates of the face-to-face position. Still further, the change in electrostatic capacitance differs according to the distance from the target such as finger tip to the sensor surface (sensor-to-sensor distance). This makes it possible to identify the distance.

Figure 5A:
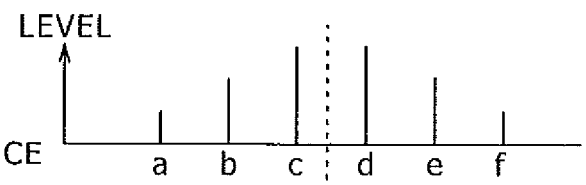
FIGS. 5A to 5C are diagrams illustrating examples of the relationship between the distance from the sensor surface to a target such as a finger tip (sensor-to-sensor distance) and the detection level of each electrode.
Figure 5B:
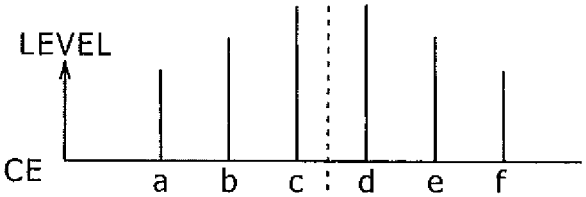
Figure 5C:
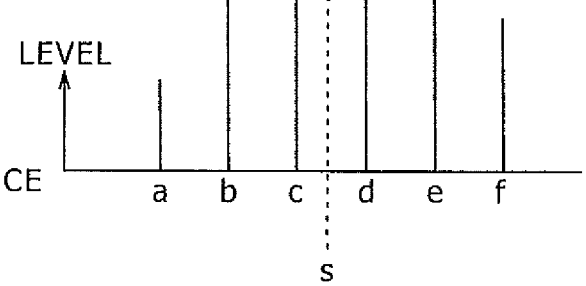

FIGS. 5A to 5C illustrate examples of the relationship between the sensor-to-sensor distance and the detection level of each electrode. In these examples, the detection levels of the vertical electrodes 'a' to 'f' are shown for the case in which the face-to-face position (contact point and projection point) is a point 's' as illustrated in FIG. 4. FIG. 5A illustrates the case in which the sensor-to-sensor distance is large, with the detection levels of the electrodes being low. FIG. 5B illustrates the case in which the sensor-to-sensor distance is intermediate, with the detection levels of the electrodes being higher than when the sensor-to-sensor distance is large. FIG. 5C illustrates the case in which the sensor-to-sensor distance is zero, indicating the target is contacted to the sensor surface with the detection levels of the electrodes being the highest.

FIG. 6 schematically illustrates a configuration example of the position detection/processing section 117. In this example, the face-to-face position (contact point and projection point) is detected separately by the horizontal and vertical electrodes 22H and 22V. The coordinates (x, y) of the face-to-face position are identified based on the detection values obtained respectively from the same electrodes 22H and 22V.

An equivalent circuit 220H relating to the horizontal electrodes 22H made up of the plurality of electrodes is interpreted as an oscillation circuit (distributed constant circuit) that includes an inductance LH, resistance RH and capacitance CH as illustrated in FIG. 6. The capacitance CH of each electrode changes according to the face-to-face position of the target such as finger tip. This change is detected as the change in a frequency fh. The frequency fh is given by the following equation (1):

$$fh=1/(2\pi\sqrt{(LH \cdot CH)}) \quad (1)$$

On the other hand, an equivalent circuit 220V relating to the vertical electrodes 22V made up of the plurality of electrodes is interpreted as an oscillation circuit (distributed constant circuit) that includes an inductance LV, resistance RV and capacitance CV as illustrated in FIG. 6. The capacitance CV of each electrode changes according to the face-to-face position of the target such as finger tip. This change is detected as the change in a frequency fv. The frequency fv is given by the following equation (2):

$$fv=1/(2\pi\sqrt{(LV \cdot CV)}) \quad (2)$$

An AC signal source 34H connected in series to a bias source 32H is connected as a drive source to the common terminal 23H for the horizontal electrode equivalent circuit 220H (actually, the horizontal electrodes 22H) via a switch 36H. The frequency fh at each electrode of the horizontal electrode equivalent circuit 220H changes according to the face-to-face position (contact point and projection point) of the finger tip as described above. The frequency fh at each electrode is supplied to an F-V conversion circuit (frequency-voltage conversion circuit) 40H where the frequency fh is converted to a detection voltage Vh commensurate with the frequency fh, after which the detection voltage Vh is supplied to a CPU 50.

On the other hand, an AC signal source 34V connected in series to a bias source 32V is connected as a drive source to the common terminal 23V for the vertical electrode equivalent circuit 220V (actually, the vertical electrodes 22V) via a switch 36V. The frequency fv at each electrode of the vertical electrode equivalent circuit 220V changes according to the face-to-face position (contact point and projection point) of the finger tip as described above. The frequency fv at each electrode is supplied to an F-V conversion circuit (frequency-voltage conversion circuit) 40V where the frequency fv is converted to a detection voltage Vv commensurate with the frequency fh, after which the detection voltage Vv is supplied to the CPU 50.

The frequency fh at each electrode of the horizontal electrode equivalent circuit 220H and the frequency fv at each electrode of the vertical electrode equivalent circuit 220V are found alternately. In order to do so, the CPU 50 controls the switches 36H and 36V. The switch 36H is turned ON, and the switch 36V is turned OFF to find the frequency fh at each electrode of the horizontal electrode equivalent circuit 220H. On the other hand, the switch 36H is turned OFF, and the switch 36V is turned ON to find the frequency fv at each electrode of the vertical electrode equivalent circuit 220V.

The CPU 50 identifies the coordinates (x, y) of the face-to-face position (contact point and projection point) of the target such as finger tip based on the detection voltage Vh for each horizontal electrode supplied from the F-V conversion circuit 40H and the detection voltage Vv for each vertical electrode supplied from the F-V conversion circuit 40V. In this case, the y coordinate is identified from the horizontal electrode position where the peak voltage is detected of all the detection voltages Vh for the horizontal electrodes. The x coordinate is identified from the vertical electrode position where the peak voltage is detected of all the detection voltages Vv for the vertical electrodes.

Further, the CPU 50 identifies the distance z2 from the sensor surface to the target such as finger tip based on the detection voltage Vh for each horizontal electrode supplied from the F-V conversion circuit 40H and the detection voltage Vv for each vertical electrode supplied from the F-V conversion circuit 40V. In this case, the distance z2 is identified from the peak voltage level. As a result, the CPU 50 identifies the three-dimensional position (x, y, z2) of the finger tip based on the detection voltage Vh for each horizontal electrode and the detection voltage Vv for each vertical electrode.

Still further, the CPU 50 identifies the distance z1 from the sensor surface to the user 105 (eyes of the user 105) based on the detection voltage Vh for each horizontal electrode supplied from the F-V conversion circuit 40H and the detection voltage Vv for each vertical electrode supplied from the F-V conversion circuit 40V. In this case, the distance z1 is identified from the voltage level other than the peak voltage.

Figure 7A:
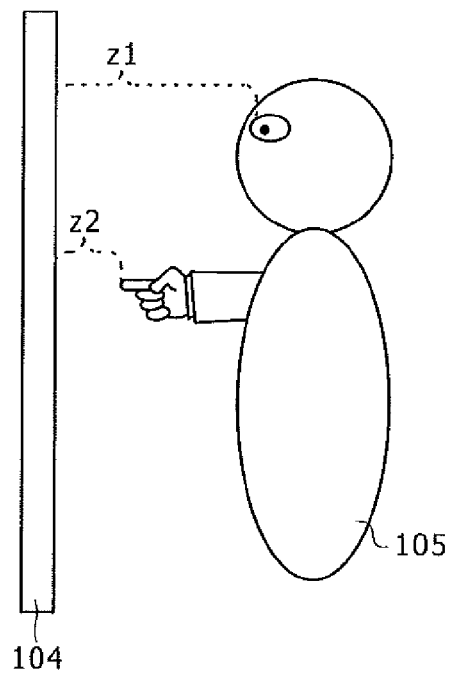
FIGS. 7A and 7B are diagrams illustrating the positional relationship between the electrostatic capacitance sensor and user and an example of a detection voltage Vh for each electrode of the electrostatic capacitance sensor.
Figure 7B:
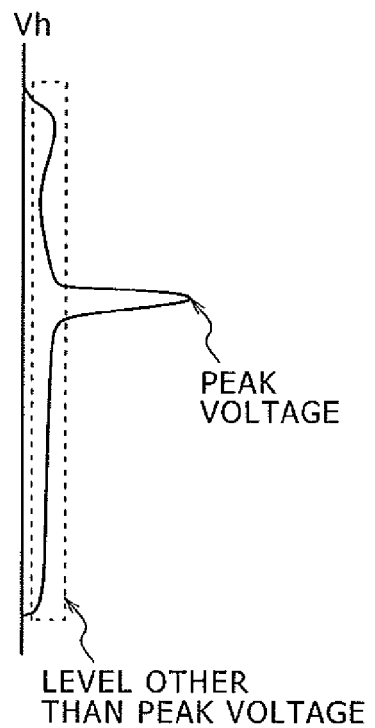

FIG. 7A illustrates the positional relationship between the electrostatic capacitance sensor 104 and user 105. In this case, for example, the detection voltage Vh for each horizontal electrode is as shown in FIG. 7B. Therefore, the y coordinate of the finger tip is identified based on the horizontal electrode position where the peak voltage Vh is detected. Further, the peak voltage level is commensurate with the distance z2 from the sensor surface to the target such as finger tip. Therefore, the distance z2 is identified based on the peak voltage level. On the other hand, the voltage levels other than the peak level are commensurate with the distance z1 from the sensor surface to the user 105 (eyes of the user 105). Therefore, the distance z1 is identified based on these voltage levels.

A description will be given below of the control operation performed by the control section 111 of the vending machine 100 shown in FIG. 1 with reference to the flowchart shown in FIG. 8 and in association with the actions of the user 105. First, in step ST1, the user 105 approaches the vending machine 100. When the user 105 approaches the vending machine 100, the control section 111 displays, on the LCD 102, an image 1 with a text saying "Hold your hand over" as shown in FIG. 9 in step ST2. It should be noted that the determination as to whether the user 105 has approached the vending machine 100 can be made, for example, based on the distance z1 from the sensor surface to the user 105 (eyes of the user 105) obtained by the position detection/processing section 117 (refer to FIG. 2). Alternatively, this determination can be made by using the output of other sensor.

Figure 10A:
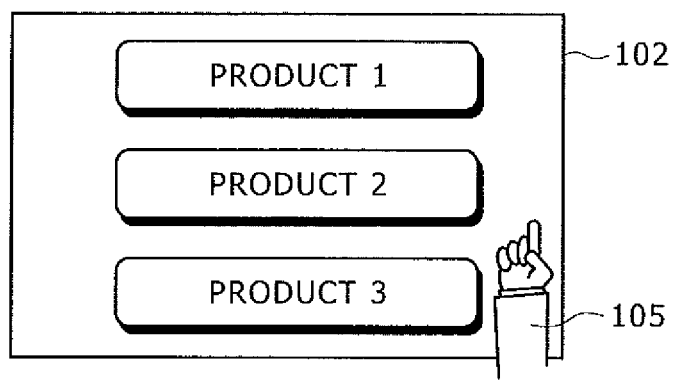
FIGS. 10A and 10B are diagrams illustrating an example of a display image and an example of the distance from the sensor surface to the user's hand at that time.
Figure 10B:
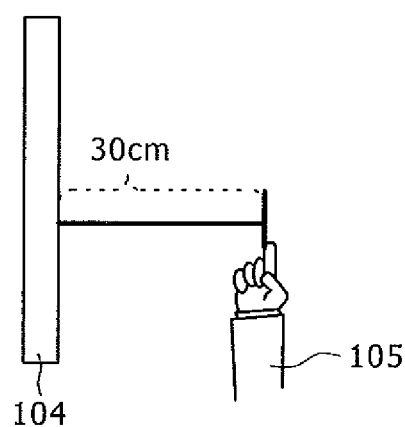

In response to the display of the image 1, the user 105 brings his or her hand close to the image in step ST3. When the user 105 brings his or her hand close to the image, the control section 111 displays an image 2 on the LCD 102 as shown in FIG. 10A in step ST4. In the image 2, a plurality of product selection buttons for selecting the products are stereoscopically displayed. In this example, three product selection buttons for products 1 to 3 are stereoscopically displayed. It should be noted that each of the product selection buttons has the product name or its illustration on it for convenience of the user 105. FIG. 10A is a front view. In contrast, FIG. 10B is a side view.

Figure 11A:
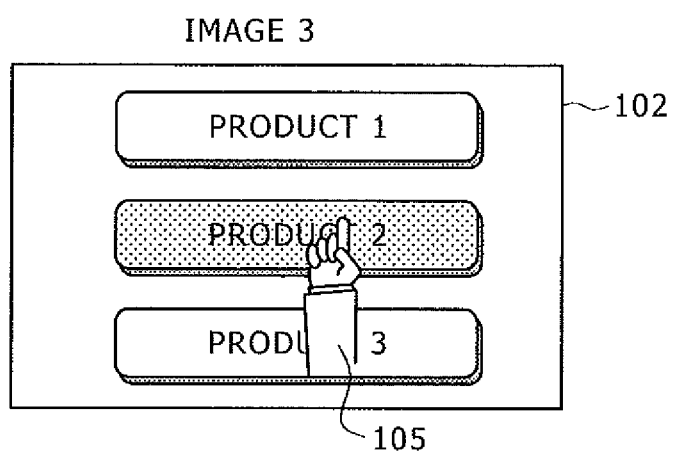
FIGS. 11A and 11B are diagrams illustrating an example of the display image and an example of the three-dimensional position of the user's hand at that time.

In response to the display of the image 2, the user 105 selects a desired product by holding his or her hand over the product selection button for the product in step ST5. When the user 105 selects the product, the control section 111 displays an image 3 on the LCD 102 as illustrated in FIG. 11A in step ST6. The image 3 is same to the image 2 shown in FIG. 10A in that the three product selection buttons for the products 1 to 3 are stereoscopically displayed. However, the manner in which the selected product selection button appears has been changed.

Figure 11B:
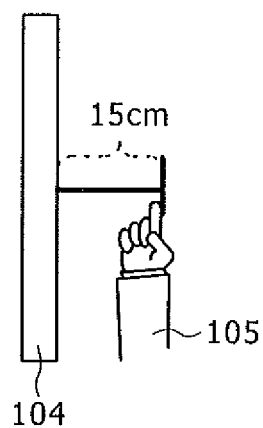

The example in FIG. 11A shows a case in which the product 2 has been selected, and the color of the product selection button has been changed. It should be noted that among the possible changes in the manner in which a product selection button appears are changes in color, shape, the extent to which the button pops up and combinations thereof. FIG. 11A is a front view. In contrast, FIG. 11B is a side view.

Figure 12A:
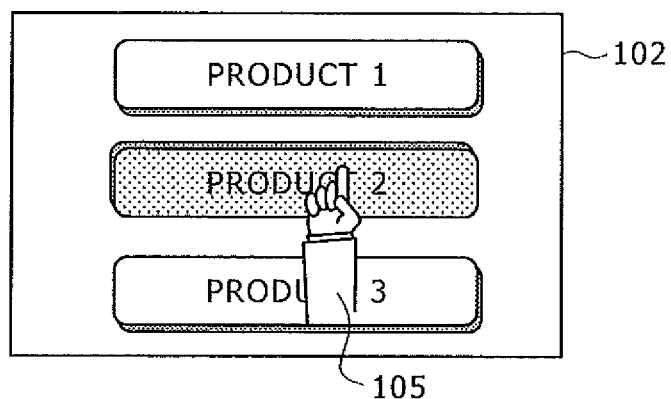
FIGS. 12A and 12B are diagrams illustrating an example of the display image and an example of the three-dimensional position of the user's hand at that time.

In response to the display of the image 3, the user 105 orders the product by bringing his or her hand close to the selected product selection button, i.e., the product selection button that appears in a different manner, in step ST7. When the user 105 orders a product, the control section 111 displays an image 4 on the LCD 102 as illustrated in FIG. 12A in step ST8.

Figure 12B:
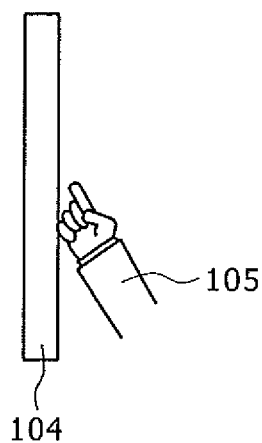

The image 4 is same to the image 3 shown in FIG. 11A in that the three product selection buttons for the products 1 to 3 are stereoscopically displayed. However, the manner in which the selected product selection button appears (e.g., color, shape, and the extent to which the button pops up) has further been changed. FIG. 12A is a front view. In contrast, FIG. 12B is a side view. Here, if the extent to which the product selection button is popped up is changed, the button may be, for example, popped up less so that it appears pressed in.

After the image 4 is displayed, the control section 111 ejects the ordered product into the dispensing chute 103. Then, the user 105 takes out the product, ejected into the dispensing chute 103, from the same chute 103 in step ST10.

Figure 13:
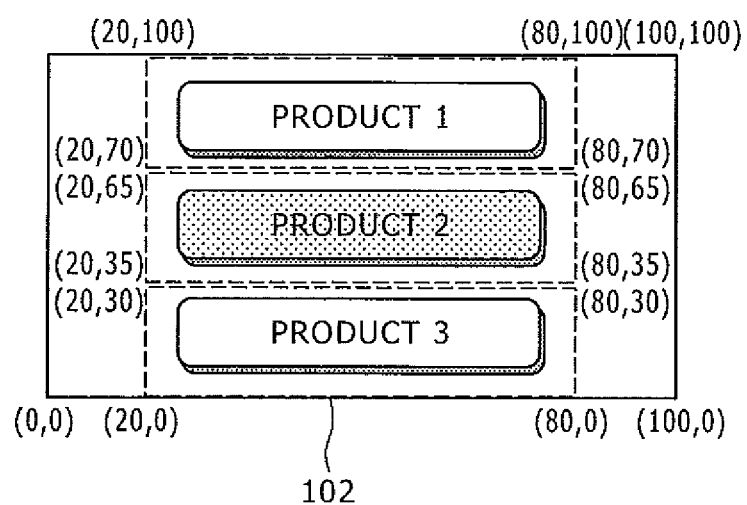
FIG. 13 is a diagram illustrating an example of set coordinates of product selection buttons used to determine that a selection has been made.

It should be noted that when the user 105 selects a product by holding his or her hand over in step ST5, coordinates are set for each product section button to determine over which product selection button the user 105 is holding his or her hand. FIG. 13 illustrates an example of set coordinates. In this example, the coordinates (x, y) of the bottom left corner of the display surface of the LCD 102 are (0, 0), and those of the top right corner thereof are (100, 100). It should be noted that the unit is, for example, in mm.

In the example shown in FIG. 13, the set selection range for the product selection button for the product 1 is from 20 to 80 for the x coordinate and from 70 to 100 for the y coordinate. Therefore, if the x and y coordinates of the three-dimensional position (x, y, z2) of the finger tip obtained by the position detection/processing section 117 fall within these ranges, it is determined that the user holds his or her hand over the product selection button for the product 1, that is, the user is pointing to this product selection button with his or her finger.

Further, in the example shown in FIG. 13, the set selection range for the product selection button for the product 2 is from 20 to 80 for the x coordinate and from 35 to for the y coordinate. Therefore, if the x and y coordinates of the three-dimensional position (x, y, z2) of the finger tip obtained by the position detection/processing section 117 fall within these ranges, it is determined that the user holds his or her hand over the product selection button for the product 2, that is, the user is pointing to this product selection button with his or her finger.

Still further, in the example shown in FIG. 13, the set selection range for the product selection button for the product 3 is from 20 to 80 for the x coordinate and from 0 to for the y coordinate. Therefore, if the x and y coordinates of the three-dimensional position (x, y, z2) of the finger tip obtained by the position detection/processing section 117 (refer to FIG. 2) fall within these ranges, it is determined that the user holds his or her hand over the product selection button for the product 3, that is, the user is pointing to this product selection button with his or her finger.

Figure 8:
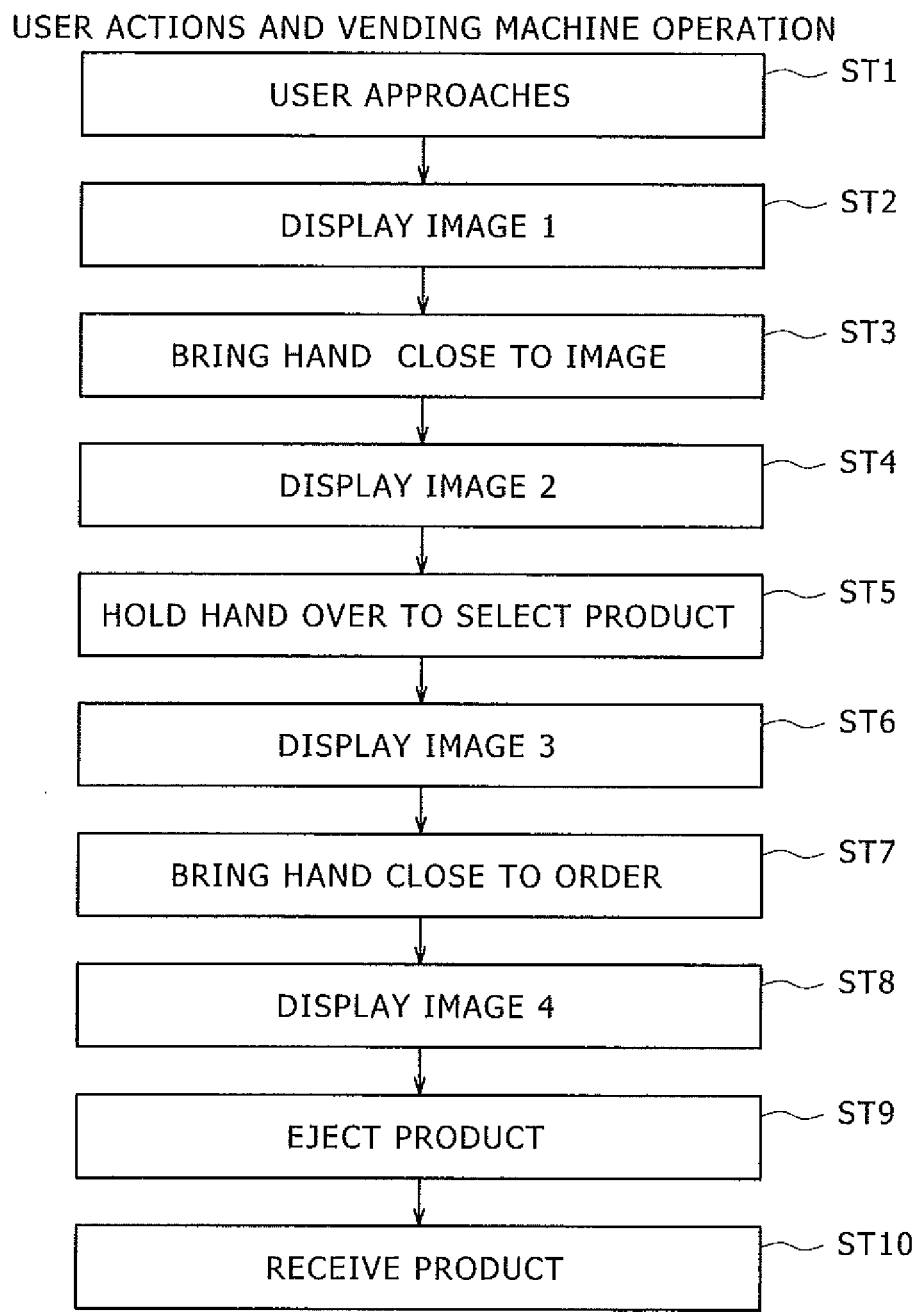
FIG. 8 is a flowchart for describing the control operation performed by a control section of the vending machine in association with the user's actions.
Figure 9:
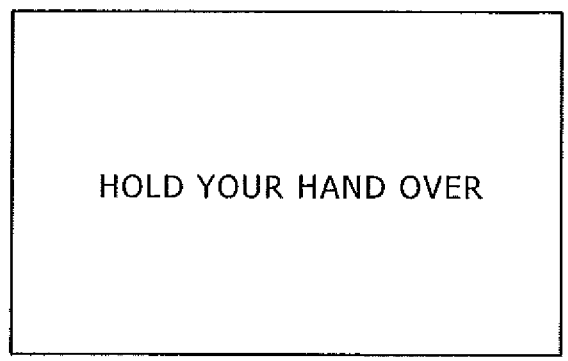
FIG. 9 is a diagram illustrating an example of a display image.

FIGS. 14A to 14H illustrate a list of images, i.e., the image 1 displayed in step ST2, image 2 displayed in step ST4, images 3 displayed in step ST6 and images 4 displayed in step ST8 of the flowchart shown in FIG. 8.

FIG. 14A illustrates an image (image 1-1) shown in step ST2 as the image 1. FIG. 14B illustrates an image (image 2-1) shown in step ST4 as the image 2. FIGS. 14C, 14D and 14E illustrate three different images (image 3-1, 3-2 and 3-3) shown in step ST6 as the images 3. FIGS. 14F, 14G and 14H illustrate three different images (image 4-1, 4-2 and 4-3) shown in step ST8 as the images 4.

FIG. 15 illustrates an example of a set action for each condition of the three-dimensional position (x, y, z2) of the finger tip acquired by the position detection/processing section 117 (refer to FIG. 2). That is, an action is set to display the image 1-1 when the user 105 approaches the vending machine 100. Further, an action is set to display the image 2-1 when z2<300.

Still further, an action is set to display the image 3-1 when z2<150 and 80 and 0≤y≤30. Still further, an action is set to display the image 3-2 when z2<150 and 80 and 35≤y≤65. Still further, an action is set to display the image 3-3 when z2<150 and 80 and 70≤y≤100.

Still further, an action is set to display the image 4-1 when z2=0 and 80 and 0≤y≤30. Still further, an action is set to display the image 4-2 when z2=0 and 20≤x≤80 and 35≤y≤65. Still further, an action is set to display the image 4-3 when z2=0 and 20≤x≤80 and 70≤y≤100.

As described above, the binocular parallax images displayed on the LCD 102, i.e., the stereoscopic image visually perceived by the user 105, is controlled according to the three-dimensional position (x, y, z2) of the finger tip of the user 105 in the vending machine 100 shown in FIG. 1. This provides improved user operation accuracy, thus contributing to improved ease of use for the user.

It should be noted that when the user 105 visually perceives a stereoscopic image as a result of binocular parallax images being displayed on the LCD 102, the position where the stereoscopic image is visually perceived changes according to the position of the user 105 (eyes of the user) if the parallax between the left and right eye images is constant. In the description of the flowchart shown in FIG. 8, the control section 111 controls the display image based on the three-dimensional position (x, y, z2) of the finger tip. That is, the control section 111 only controls which image to display based on the three-dimensional position (x, y, z2) of the finger tip.

Figure 16:
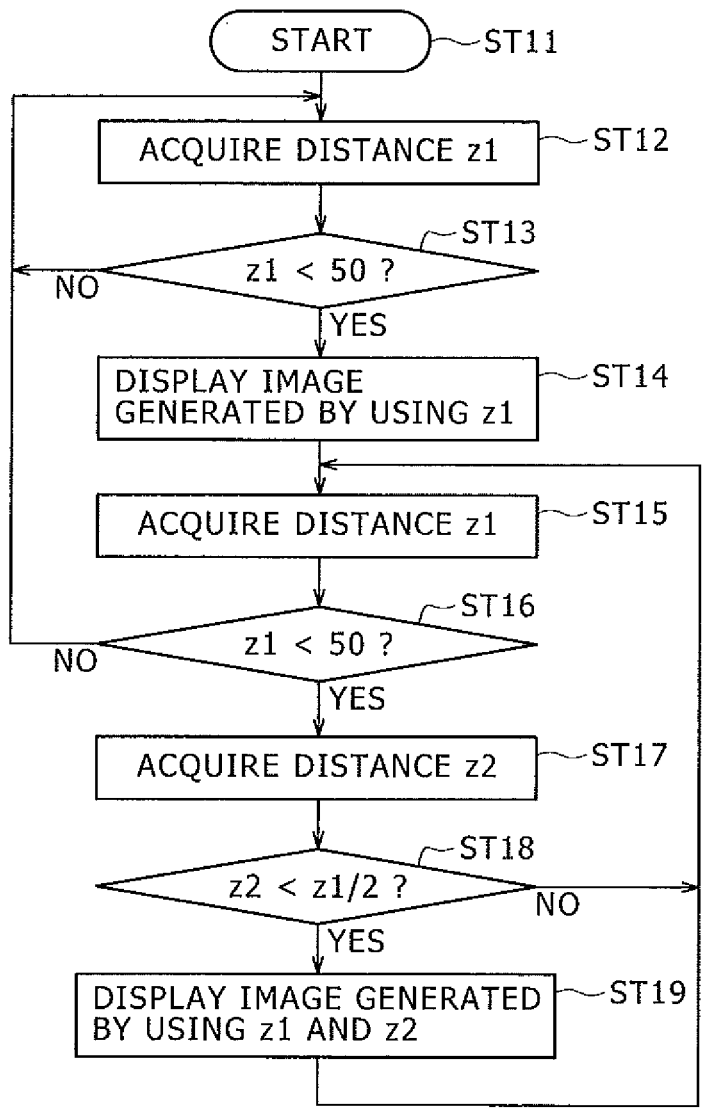
FIG. 16 is a flowchart illustrating an example of display image control performed by the control section of the vending machine.

Alternatively, the control section 111 can adjust the parallax between the left and right eye images according to the position of the user 105, ensuring that a stereoscopic image is visually perceived always at the same position irrespective of the position of the user 105. The flowchart shown in FIG. 16 illustrates an example of control operation performed by the control section 111. The control section 111 generates and displays an image associated with the distance z2 from the sensor surface to the finger tip while at the same time adjusting the position where the user 105 visually perceives a stereoscopic image based on the distance z1 from the sensor surface to the user 105 (eyes of the user 105).

The control section 111 initiates its control operation in step ST11 and proceeds to the process in step ST12. In step ST12, the control section 111 acquires the distance z1 from the position detection/processing section 117 (refer to FIG. 2). Next, the control section 111 determines in step ST13 whether the distance z1 is less than 50 cm. If the distance is not less than 50 cm, the control section 111 returns to the process in step ST12.

When the distance z1 is less than 50 cm in step ST13, the control section 111 proceeds to the process in step ST14. In step ST14, the control section 111 displays an image generated using the distance z1. In this case, for example, the image 2 in the flowchart shown in FIG. 8 is displayed. The parallax between the binocular parallax images is adjusted based on the distance z1, thus maintaining constant the position where the user 105 visually perceives a stereoscopic image irrespective of the position of the user 105.

Next, in step ST15, the control section 111 acquires the distance z1 from the position detection/processing section 117 (refer to FIG. 2). Then, the control section 111 determines in step ST16 whether the distance z1 is less than 50 cm. The distance z1 was acquired in step ST12. However, the distance z1 is acquired again in step ST15 to make a determination in step ST15 to deal with the case in which the user has moved. If the distance is not less than 50 cm, the control section 111 returns to the process in step ST12.

When the distance z1 is less than 50 cm in step ST16, the control section 111 acquires the distance z2 from the position detection/processing section 117 (refer to FIG. 2) in step ST17. Next, in step ST18, the control section 111 determines whether the inequality z2<z1/2 holds. If the inequality z2<z1/2 does not hold, the control section 111 returns to the process in step ST15.

When the inequality z2<z 1/2 holds in step ST18, the control section 111 displays an image generated using the distances z1 and z2 in step ST19. In this case, for example, the image 3 or 4 in the flowchart shown in FIG. 8 is displayed. The parallax between the binocular parallax images is adjusted based on the distance z1, thus maintaining constant the position where the user 105 visually perceives a stereoscopic image irrespective of the position of the user 105. The control section 111 returns to the process in step ST15 after the process in step ST19.

2. Second Embodiment

[Configuration Example of the Digital Signage Device]

Figure 17:
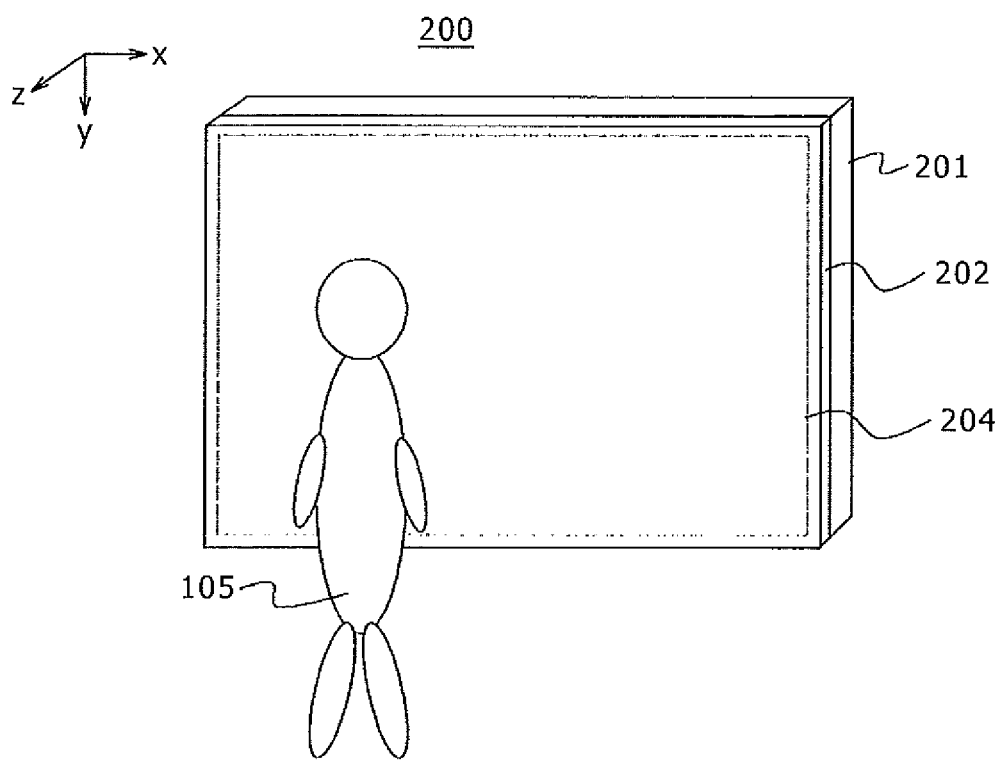
FIG. 17 is a diagram schematically illustrating the appearance of a digital signage device as a second embodiment of the present disclosure.

FIG. 17 illustrates the appearance of a digital signage device 200 as a second embodiment of the present disclosure. A flat display panel such as an LCD (Liquid Crystal Display) 202 is provided on the front side of an outer enclosure 201 of the digital signage device 200. The LCD 202 makes up an image display section adapted to display binocular parallax images.

An electrostatic capacitance sensor 204 is placed on the display surface of the LCD 202. The electrostatic capacitance sensor 204 makes up a position information acquisition section. The position information acquisition section acquires information representing the three-dimensional position (x, y, z2) of a target existing in the three-dimensional space on the display surface of the LCD 202. In the present embodiment, the target is the hand of the user 105. Further, the position information acquisition section acquires information about the distance z1 between the display surface of the LCD 202 and the user 105.

When the user 105 approaches the display image on the LCD 202 closer than a given distance, the LCD 202 displays, as a stereoscopic image, binocular parallax images that allow predetermined public relations information such as a product or character to be visually perceived by the user 105. Then, when the hand of the user 105 approaches the display surface as a result of the user 105 stretching out his or her hand, the manner in which the product or character, for example, appears changes, allowing it to be visually perceived on the hand. Then, when the user 105 moves the hand, the position where the product or character, for example, is visually perceived changes with change in the hand position.

Figure 18:
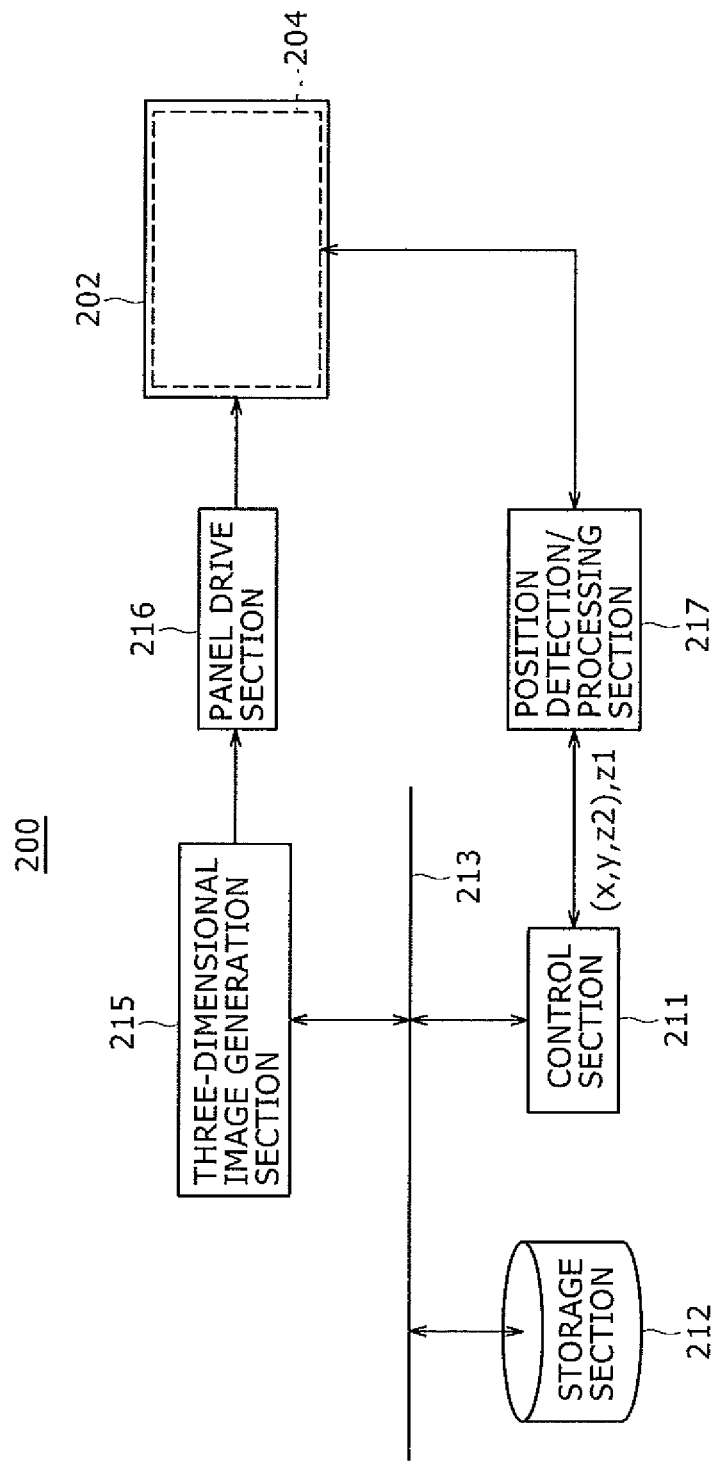
FIG. 18 is a block diagram illustrating an example of circuit configuration of the digital signage device.

FIG. 18 illustrates an example of circuit configuration of the digital signage device 200. The digital signage device 200 includes a control section 211, a storage section 212, a bus 213, a three-dimensional image generation section 215, a panel drive section 216 and a position detection/processing section 217 in addition to the LCD 202 and the electrostatic capacitance sensor 204.

The control section 211 controls the operation of various sections of the digital signage device 200. The storage section 212 stores in advance the operation program of the control section 211, image data used to generate binocular parallax images (left and right eye images) and other data. The three-dimensional image generation section 215 generates display image data used to display the binocular parallax images (left and right eye images) under control of the control section 211.

The control section 211 is connected to the storage section 212 via the bus 213. Further, the control section 211 controls the operation of the three-dimensional image generation section 215 via the bus 213.

The panel drive section 216 drives the LCD 202 based on the display image data generated by the three-dimensional image generation section 215, allowing the LCD 202 to display the binocular parallax images that allow the user 105 to visually perceive a stereoscopic image. The position detection/processing section 217 makes up the position information acquisition section together with the electrostatic capacitance sensor 204. The position detection/processing section 217 outputs information about the three-dimensional position (x, y, z2) of the hand (target) of the user 105 existing in the three-dimensional space on the display surface of the LCD 202. Further, the position detection/processing section 217 outputs information about the distance z1 between the display surface of the LCD 202 and the user 105.

The position information acquisition section (electrostatic capacitance sensor 204 and position detection/processing section 217) is configured in the same manner as the position information acquisition section (electrostatic capacitance sensor 104 and position detection/processing section 117) of the vending machine 100. Therefore, a detailed description of the position information acquisition section (electrostatic capacitance sensor 204 and position detection/processing section 217) is omitted here.

Figure 19:
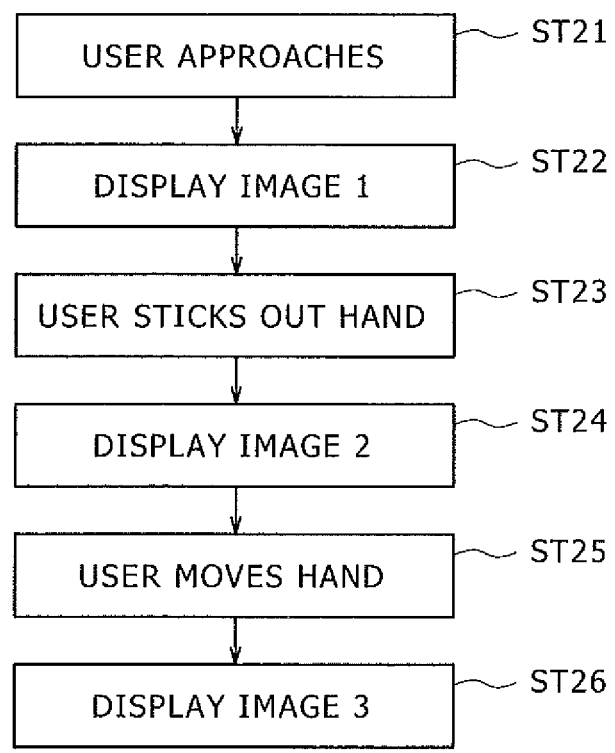
FIG. 19 is a flowchart for describing the control operation performed by the control section of the digital signage device in association with the user's actions.
Figure 20A:
FIGS. 20A and 20B are diagrams illustrating examples of display images.

A description will be given below of the control operation performed by the control section 211 of the digital signage device 200 shown in FIG. 17 with reference to the flowchart shown in FIG. 19 and in association with the actions of the user 105. First, in step ST21, the user 105 approaches the digital signage device 200. When the user 105 approaches the digital signage device 200, the control section 211 displays, on the LCD 202, the image 1 with predetermined public relations information such as a product or character as shown in FIG. 20A in step ST22. In the example shown in FIG. 20A, the image contains a little bird therein.

Figure 20B:
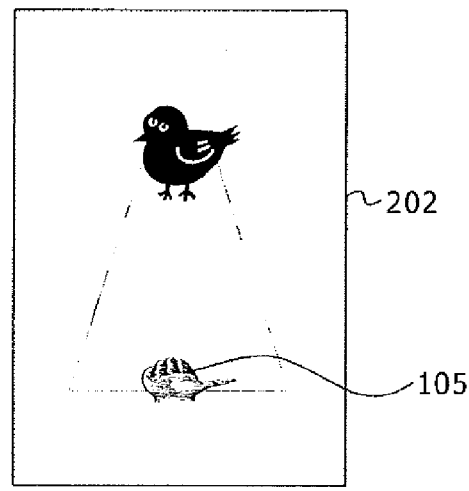
Figure 21A:
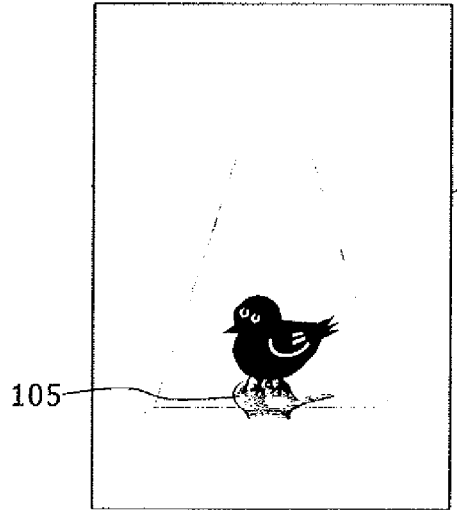
FIGS. 21A and 21B are diagrams illustrating an example of a display image and examples of the three-dimensional position of the user's hand at that time.

In response to the display of the image 1, the user 105 stretches out his or her hand as shown in FIG. 20B in step ST23. When the user 105 stretches out his or her hand, the control section 211 displays the image 2 on the LCD 202 as shown in FIG. 21A in step ST24. The image 2 is a stereoscopic image in which a little bird is visually perceived on the hand of the user 105.

Figure 21B:
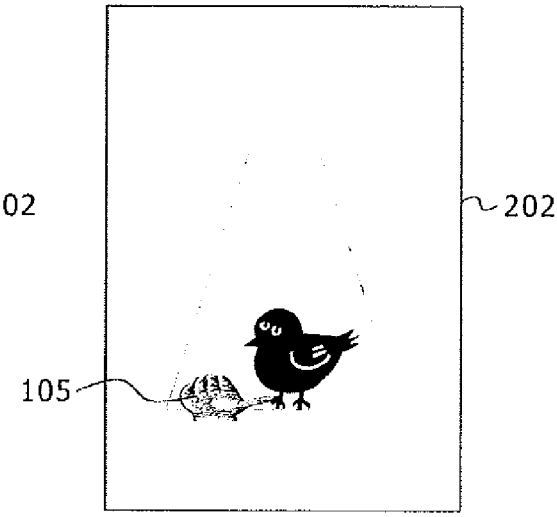
Figure 22:
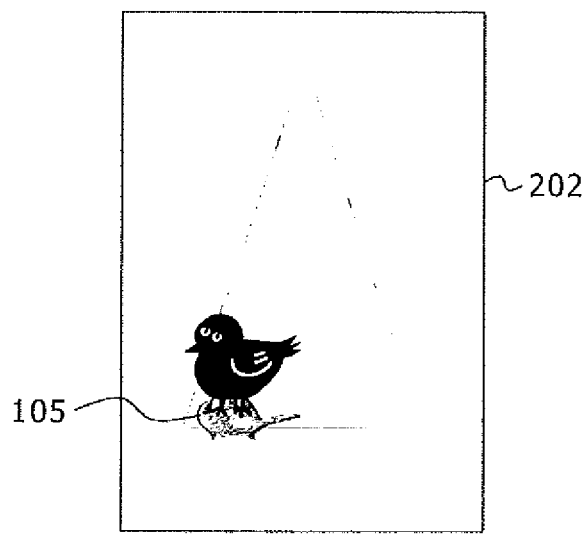
FIG. 22 is a diagram illustrating an example of a display image and an example of the three-dimensional position of the user's hand at that time.

Next, in step ST25, the user 105 moves his or her hand as shown in FIG. 21B. In this example, the user 105 moves his or her hand horizontally. When the user 105 moves his or her hand, the control section 211 displays the image 3 on the LCD 202 as shown in FIG. 22 in step ST26. The image 3 is a stereoscopic image in which the little bird follows the movement of the hand of the user 105 so that the bird is visually perceived on the hand of the user 105 that has moved.

Figure 23:
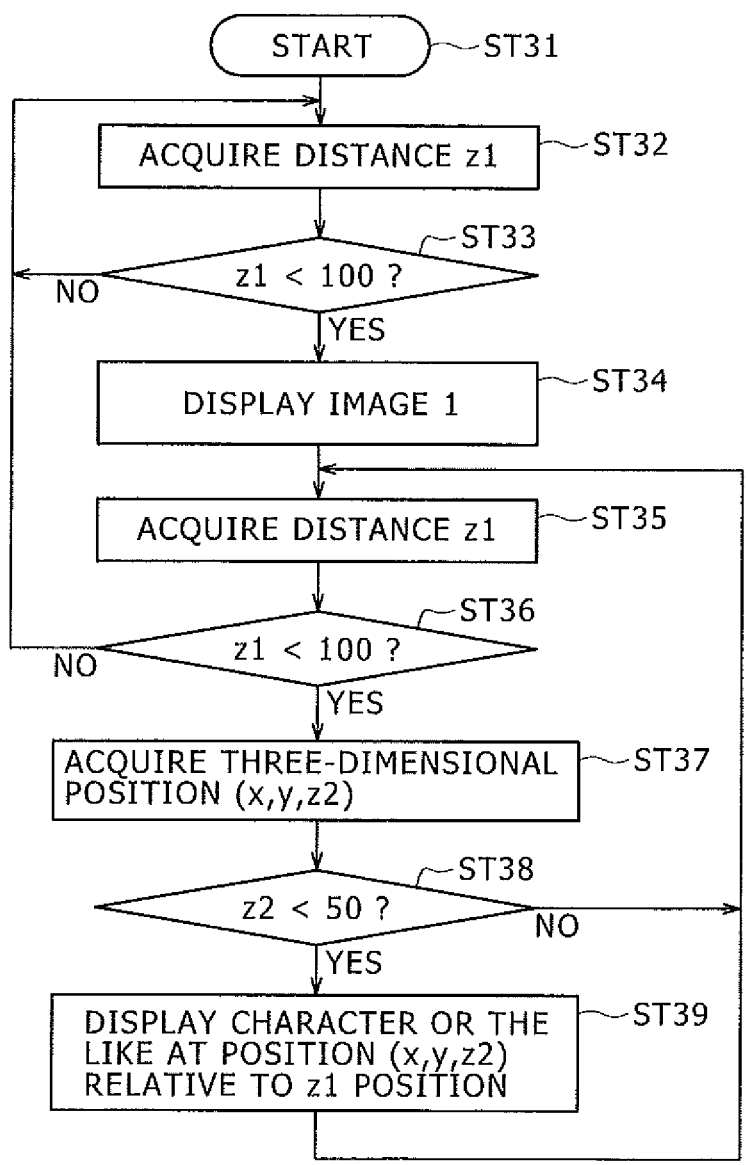
FIG. 23 is a flowchart illustrating an example of display image control performed by the control section of the digital signage device.

The flowchart shown in FIG. 23 illustrates an example of display image control operation performed by the control section 211. The control section 211 initiates its control operation in step ST31 and proceeds to the process in step ST32. In step ST32, the control section 211 acquires information about the distance z1 between the display surface of the LCD 202 and the user 105 from the position detection/processing section 217 (refer to FIG. 18). Next, the control section 211 determines in step ST33 whether the distance z1 is less than 100 cm. If the distance is not less than 100 cm, the control section 211 returns to the process in step ST32.

When the distance z1 is less than 100 cm in step ST33, the control section 211 proceeds to the process in step ST34. In step ST34, the control section 211 displays the image 1 (refer to FIG. 20A). Then, the control section 211 acquires the distance z1 from the position detection/processing section 217 (refer to FIG. 18) in step ST35. Next, the control section 211 determines in step ST36 whether the distance z1 is less than 100 cm. If the distance is not less than 100 cm, the control section 211 returns to the process in step ST32.

When the distance z1 is less than 100 cm in step ST36, the control section 211 proceeds to the process in step ST37. In step ST37, the control section 211 acquires information about the three-dimensional position (x, y, z2) of the hand (target) of the user 105 from the position detection/processing section 217 (refer to FIG. 18). Next, the control section 211 determines in step ST38 whether the distance z2 is less than 50 cm. If the distance is not less than 50 cm, the control section 211 returns to the process in step ST35.

When the distance z2 is less than 50 cm in step ST38, the control section 211 proceeds to the process in step ST39. In step ST39, the control section 211 displays, on the LCD 202, an image generated using the distance z1 and three-dimensional position (x, y, z2). That is, the control section 211 displays a stereoscopic image such as a product or character at the position (x, y, z2) relative to the position at the distance z1 (refer to FIGS. 21A and 22). After completing the process in step ST39, the control section 211 returns to the process in step ST35.

As described above, the binocular parallax images displayed on the LCD 202, i.e., the stereoscopic image visually perceived by the user 105, is controlled according to the three-dimensional position (x, y, z2) of the finger tip of the user 105 in the digital signage device 200 shown in FIG. 17. This effectively supplies information to the user, thus contributing to improved ease of use for the user. For example, existing digital signage devices have difficulties in attracting attention. However, the digital signage device 200 shown in FIG. 17 successfully attracts attention thanks to its three-dimensional display. In addition, the same device 200 three-dimensionally grasps the action of the user 105, thus permitting more natural interactive communication.

It should be noted that the audio system is not shown for the digital signage device 200 illustrated in FIGS. 17 and 18. For example, one possibility for audio control would be to produce a sound as if the little bird chirps on the hand of the user 105.

3. Third Embodiment

[Configuration Example of the Television Receiver]

Figure 24:
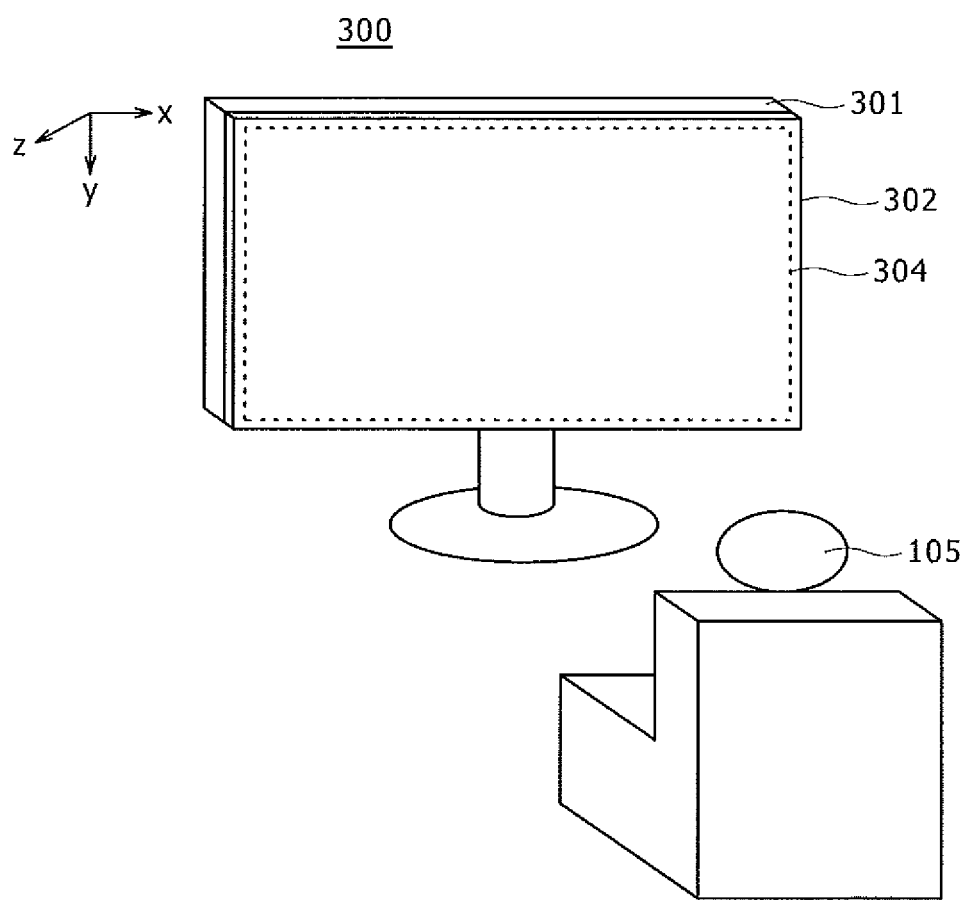
FIG. 24 is a diagram schematically illustrating the appearance of a television receiver as a third embodiment of the present disclosure.

FIG. 24 illustrates the appearance of a television receiver 300 as a third embodiment of the present disclosure. A flat display panel such as an LCD (Liquid Crystal Display) 302 is provided on the front side of an outer enclosure 301 of the television receiver 300. The LCD 302 makes up an image display section adapted to display binocular parallax images.

An electrostatic capacitance sensor 304 is placed on the display surface of the LCD 302. The electrostatic capacitance sensor 304 makes up a position information acquisition section. The position information acquisition section acquires information representing the three-dimensional position (x, y, z2) of a target existing in the three-dimensional space on the display surface of the LCD 302. In the present embodiment, the target is the hand of the user 105. Further, the position information acquisition section acquires information about the distance z1 between the display surface of the LCD 302 and the user 105.

If the user 105 brings his or her hand close to the display image on the LCD 302, the LCD 302 displays channel selection buttons superposed on the display image. Next, when the hand of the user 105 approaches the position where a channel selection button is visually perceived, the manner in which the channel selection button appears (e.g., color, size or position where it is visually perceived) changes, indicating that the channel is being selected. Then, when, with this channel selected, the user 105 stretches out his or her hand forward, the selection of the channel is decided.

Figure 25:
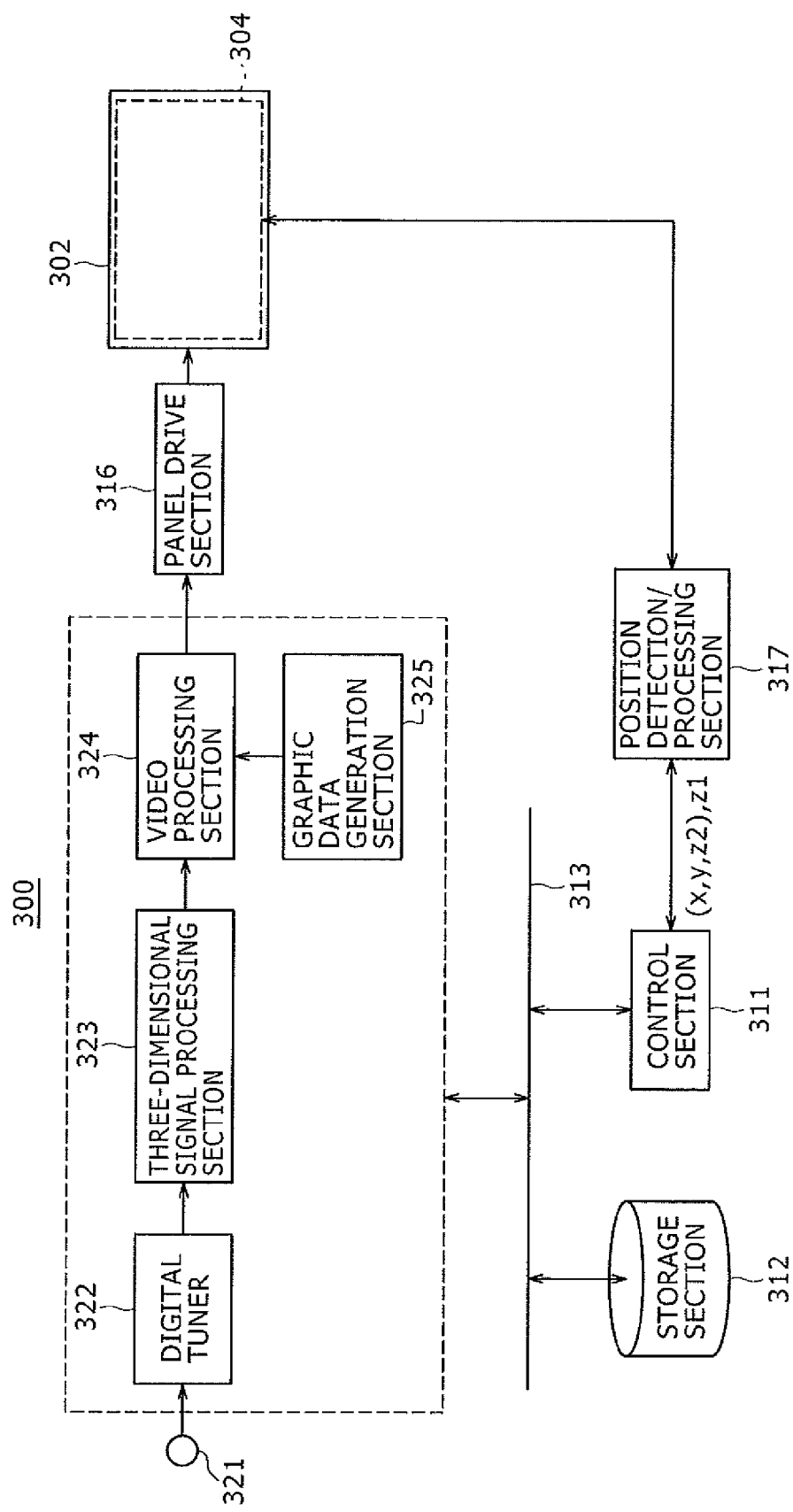
FIG. 25 is a block diagram illustrating an example of circuit configuration of the television receiver.

FIG. 25 illustrates an example of circuit configuration of the television receiver 300. The television receiver 300 includes a control section 311, a storage section 312, a bus 313 and a panel drive section 316 in addition to the LCD 302 and the electrostatic capacitance sensor 304. The television receiver 300 further includes an antenna terminal 321, a digital tuner 322, a three-dimensional signal processing section 323, a video processing section 324 and a graphic data generation section 325.

The control section 311 controls the operation of various sections of the television receiver 300. The storage section 312 stores in advance the operation program of the control section 311, data used by the graphic data generation section 325 to generate graphic data and other data. The control section 311 is connected to the storage section 312 via the bus 313.

The antenna terminal 321 is supplied with a television broadcast signal received by the reception antenna (not shown). The digital tuner 322 processes the television broadcast signal supplied to the antenna terminal 321 and outputs stereoscopic image data for the channel selected by the user. The three-dimensional signal processing section 323 decodes the stereoscopic image data output from the digital tuner 322, thus generating left and right eye image data.

The three-dimensional signal processing section 323 decodes the stereoscopic image data in a manner appropriate to the transmission format thereof. Among known transmission formats for the stereoscopic image data are Top and Bottom, Side by Side, and Frame Sequential.

The graphic data generation section 325 generates various pieces of graphic information data (graphic data) to be superposed on image data. In this case, graphic information is channel selection buttons. The graphic data generation section 325 generates two pieces of graphic information data, one to be superposed on the left eye image and another to be superposed on the right eye image. Here, the graphic information superposed on the left eye image is the same as that superposed on the right eye image. However, these pieces of information are, for example, moved horizontally to apply parallax, thus adjusting the depth position where the graphic information is visually perceived.

The video processing section 324 generates display image data used to display binocular parallax images based on the left and right eye image data generated by the three-dimensional signal processing section 323. This display image data varies depending on the stereoscopic image display method (e.g., eyeglass method and naked eye method). It should be noted that the video processing section 324 superposes the graphic information data (bit map data) generated by the graphic data generation section 325 on the image data.

The panel drive section 316 drives the LCD 302 based on the display image data generated by the video processing section 324, allowing the LCD 302 to display the binocular parallax images that allow the user 105 to visually perceive a stereoscopic image. The position detection/processing section 317 makes up the position information acquisition section together with the electrostatic capacitance sensor 304. The position detection/processing section 317 outputs information about the three-dimensional position (x, y, z2) of the hand (target) of the user 105 existing in the three-dimensional space on the display surface of the LCD 302. Further, the position detection/processing section 317 outputs information about the distance z1 between the display surface of the LCD 302 and the user 105.

The position information acquisition section (electrostatic capacitance sensor 304 and position detection/processing section 317) is configured in the same manner as the position information acquisition section (electrostatic capacitance sensor 104 and position detection/processing section 117) of the vending machine 100. Therefore, a detailed description of the position information acquisition section (electrostatic capacitance sensor 304 and position detection/processing section 317) is omitted here.

Figure 26:
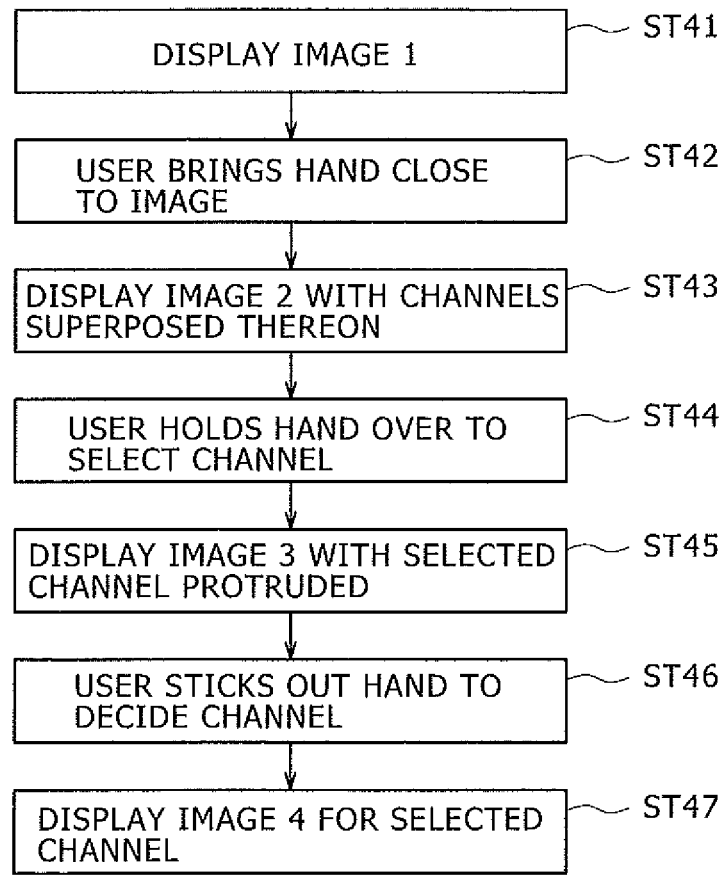
FIG. 26 is a flowchart for describing the control operation performed by the control section of the television receiver in association with the user's actions.

A description will be given below of the control operation performed by the control section 311 of the television receiver 300 shown in FIG. 24 with reference to the flowchart shown in FIG. 26 and in association with the actions of the user 105. During viewing by the user, the control section 311 displays the current image 1 on the LCD 302. FIG. 27A illustrates an example of the image 1.

Figure 27B:
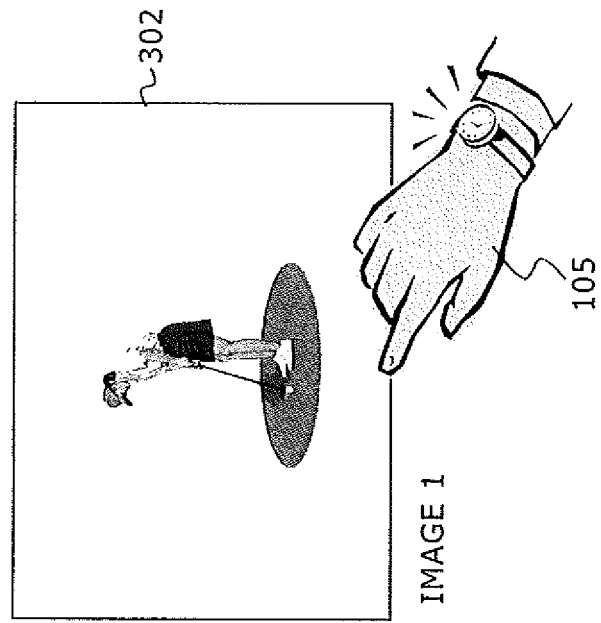
FIGS. 27A and 27B are diagrams illustrating examples of display images.
Figure 27A:
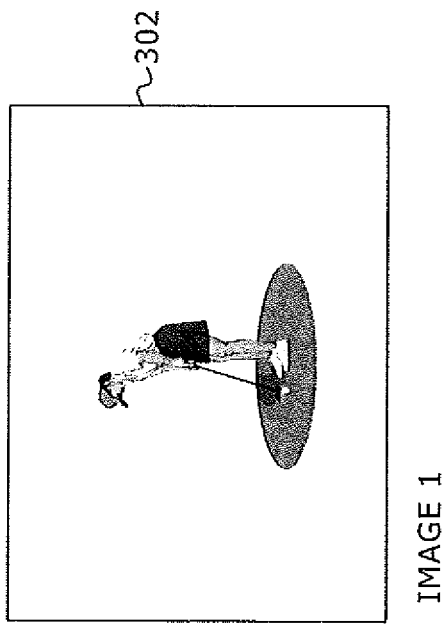
Figure 28A:
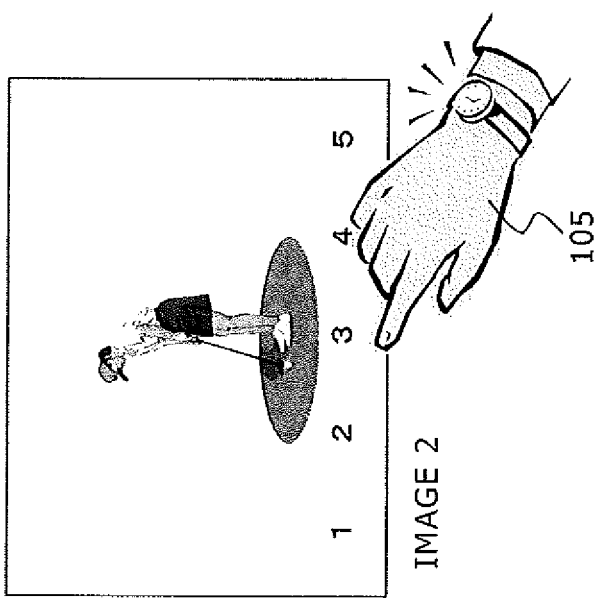
FIGS. 28A and 28B are diagrams illustrating examples of display images and examples of the three-dimensional position of the user's hand at that time.

With the image 1 displayed, the user 105 brings his or her hand close to the image as illustrated in FIG. 27B in step ST42. When the user 105 brings his or her hand close to the image, the control section 311 displays the image 2 on the LCD 302 as shown in FIG. 28A in step ST43. The channel selection buttons for the selectable channels are superposed on the image 2. In this example, the channel selection buttons are shown in the form of channel numbers.

Figure 28B:
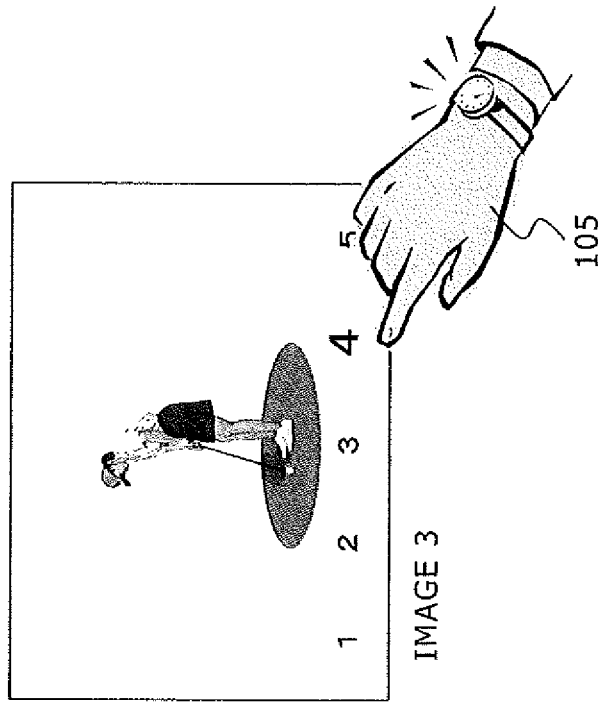

In response to the display of the image 2, the user 105 selects a desired channel by holding his or her hand over the channel selection button for the channel in step ST44. When the user 105 selects the channel, the control section 311 displays the image 3 on the LCD 302 as illustrated in FIG. 28B in step ST45. The selected channel appears to protrude from the screen in the image 3. In this example, the channel selection button for channel 4 superposed on the image appears to protrude from the screen, that is, the visual perception position is forward.

Figure 29:
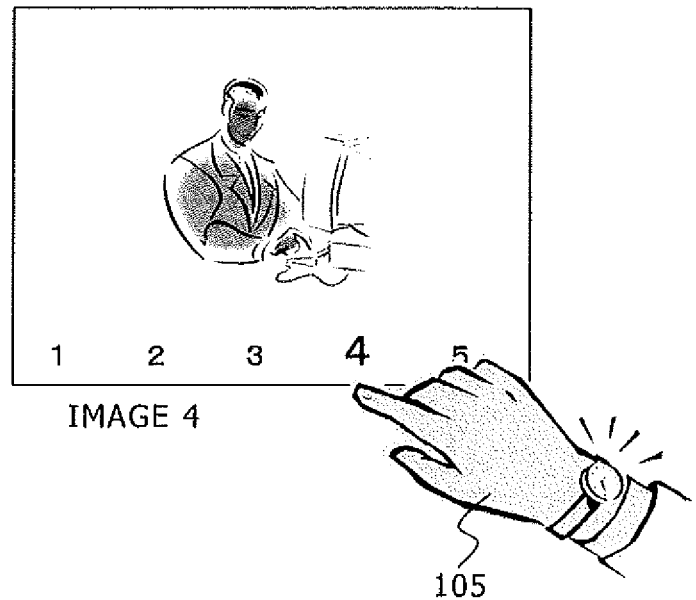
FIG. 29 is a diagram illustrating an example of a display image and an example of the three-dimensional position of the user's hand at that time.

In response to the display of the image 3, the user 105 decides the channel selection by stretching out his or her hand, held over the channel selection button for the selected channel, forward. In response to the decision of the channel selection, the control section 311 changes the selected channel of the digital tuner 322, displaying the image 4 for the newly selected channel on the LCD 302. FIG. 29 illustrates an example of the image 4.

Figure 30:
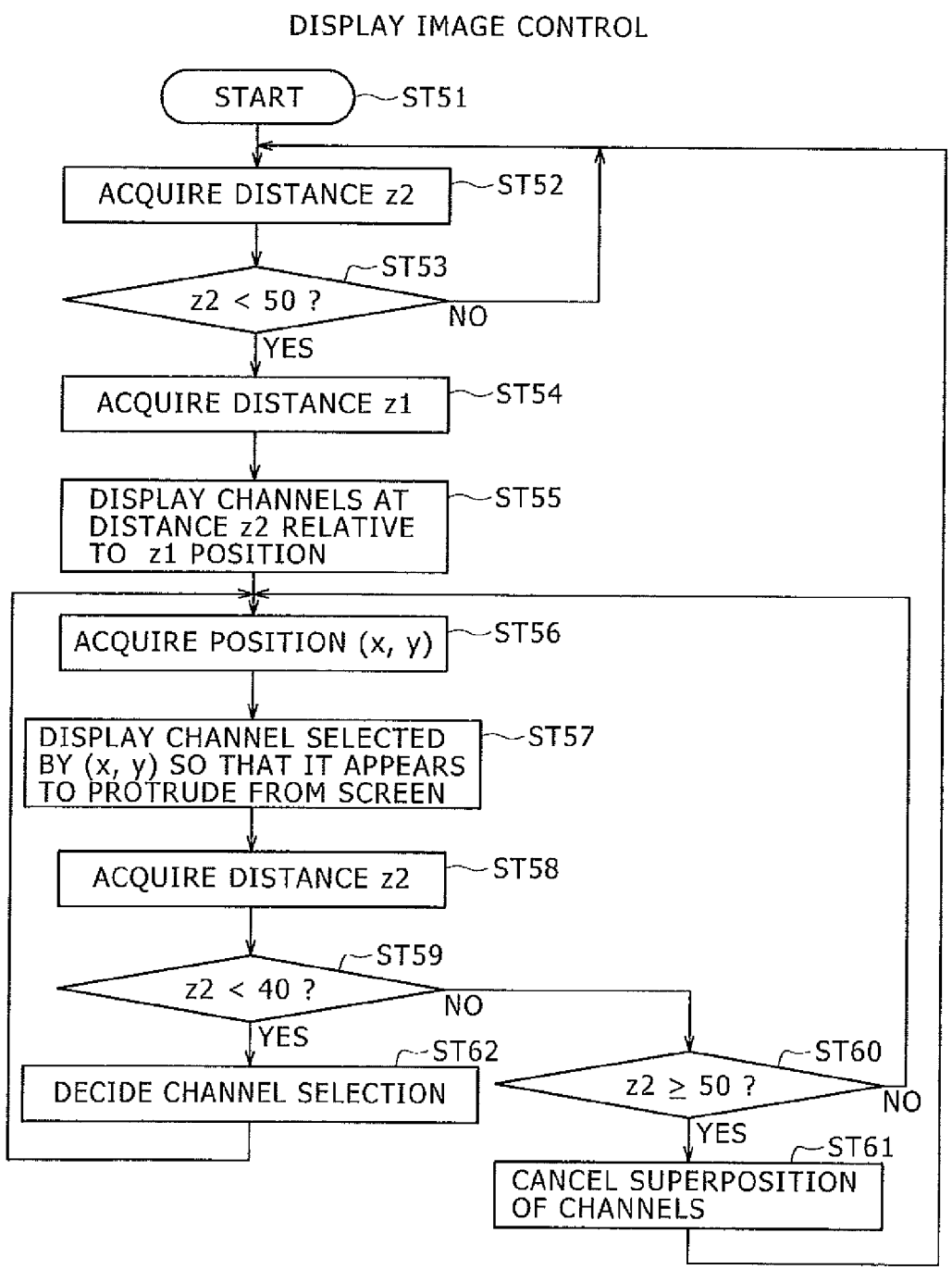
FIG. 30 is a flowchart illustrating an example of display image control performed by the control section of the television receiver.

The flowchart shown in FIG. 30 illustrates an example of display image control performed by the control section 311. The control section 311 initiates its control operation in step ST51 and proceeds to the process in step ST52. In step ST52, the control section 311 acquires information about the distance z2 between the display surface of the LCD 302 and the finger tip of the user 105 from the position detection/processing section 317 (refer to FIG. 25). Next, the control section 311 determines in step ST53 whether the distance z2 is less than 50 cm. If the distance z2 is not less than 50 cm, the control section 311 returns to the process in step ST52.

When the distance z2 is less than 50 cm in step ST53, the control section 311 proceeds to the process in step ST54. In step ST54, the control section 311 acquires information about the distance z1 between the display surface of the LCD 302 and the user 105 (eyes of the user 105) from the position detection/processing section 317 (refer to FIG. 25). Next, in step ST55 the control section 311 displays the channels (channel selection buttons) at the distance z2 relative to the position at the distance z1 so that the channels (channel selection buttons) are visually perceived to superpose on the image (refer to FIG. 28A).

Next, the control section 311 acquires information about the position (x, y) of the finger tip of the user 105 from the position detection/processing section 317 (refer to FIG. 25) in step ST56. Then, the control section 311 displays the channel (channel selection button) at the position (x, y) in such a manner that it appears to protrude from the screen (refer to FIG. 28B) in step ST57, thus clearly indicating the selected channel.

Next, the control section 311 acquires information about the distance z2 between the display surface of the LCD 302 and the finger tip of the user 105 from the position detection/processing section 317 (refer to FIG. 25). Then, the control section 311 determines in step ST59 whether the distance z2 is less than 40 cm. That is, the control section 311 determines in step ST59 whether the user 105 is stretching out his or her hand further to decide the channel selection.

If the distance is not less than 40 cm, the control section 311 determines in step ST60 whether the distance z2 is not less than or equal to 50 cm. If the distance z2 is less than 50 cm, the control section 311 returns to the process in step ST56. On the other hand, when the distance z2 is not less than or equal to 50 cm, the control section 311 cancels the superposition of the channels (channel selection buttons) on the image, and then returns to the process in step ST52.

On the other hand, when the distance z2 is less than cm in step ST59, the control section 311 returns to the process in step ST62. In step ST62, the control section 311 decides the channel selection. At this time, the control section 311 changes the selected channel of the digital tuner 322, displaying the image 4 for the newly selected channel on the LCD 302. The control section 311 returns to the process in step ST56 after the process in step ST62.

As described above, the binocular parallax images displayed on the LCD 302, i.e., the stereoscopic image visually perceived by the user 105, is controlled according to the three-dimensional position (x, y, z2) of the finger tip of the user 105 in the television receiver 300 shown in FIG. 24. This provides improved operation accuracy of the user 105 including channel selection, thus contributing to improved ease of use for the user 105.

4. Modification Example

It should be noted that, although the present disclosure is applied to the vending machine 100, digital signage device 200 and television receiver 300 in the above embodiments, it is a matter of course that the present disclosure is applicable to other types of information display devices.

In the medical sector, for example, the present disclosure can be used to display an image showing the cutting to match the movement of a surgical knife held by the subject when a stereoscopic image is displayed during a simulated autopsy of a human body. Further, in a gaming machine played by moving the body, the present disclosure can be used to detect the movements of the hands and the whole body other than the center of gravity and show an image to match the detection result.

The present disclosure is applicable to equipment such as vending machine, digital signage device and television receiver including an image display section and provides a variety of information to users.

The present disclosure contains subject matter related to that disclosed in Japanese Priority Patent Application JP 2010-129577 filed in the Japan Patent Office on Jun. 7, 2010, and Japanese Priority Patent Application JP 2009-177331 filed in the Japan Patent Office on Aug. 6, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information display device, comprising:
    an image display section adapted to display binocular parallax images;
    a display image control section adapted to control the binocular parallax images displayed on the image display section; and
    a position information acquisition section adapted to acquire position information representing a three-dimensional position of a target existing in three-dimensional space on a display surface of the image display section,
    in which the position information acquisition section further acquires information about a first distance (D1) between a first part of a user and the display surface of the image display section,
    in which the position information acquisition section further acquires information about a second distance (D2) between a second part of the user and the display surface of the image display section, in which the second part of the user is different from the first part of the user, and
    in which the display image control section causes the binocular parallax images to be displayed on the image display section according to the three-dimensional position of the target represented by the position information acquired by the position information acquisition section only when one half of D1 is greater than D2.

2. The information display device of claim 1, wherein the target is a body part of a user located in the three-dimensional space on the display surface of the image display section and adapted to make a given movement.

3. The information display device of claim 2, wherein the display image control section controls the binocular parallax images displayed on the image display section further according to the first distance (D1).

4. The information display device of claim 1, wherein the position information acquisition section includes
    an electrostatic capacitance sensor having a plurality of electrodes that are placed on the display surface of the image display section and that can serve as detection electrodes used to detect the three-dimensional position of the target, and
    a position detection/processing section adapted to detect the three-dimensional position of the target based on the values obtained by the plurality of electrodes.

5. The information display device of claim 1, wherein
    the image display section is provided on the outer enclosure of a vending machine,
    the image display section displays at least binocular parallax images that allow predetermined product selection information to be visually perceived as a stereoscopic image, and
    the image display section further includes a system control section adapted to control the operation of the vending machine according to the three-dimensional position of the target represented by the position information acquired by the position information acquisition section.

6. The information display device of claim 1, wherein
    the image display section makes up a digital signage device, and
    the image display section displays at least binocular parallax images that allow predetermined public relations information to be visually perceived as a stereoscopic image.

7. The information display device of claim 1, wherein
the image display section makes up a television receiver,
the image display section displays at least binocular parallax images that allow predetermined information for operation of the television receiver to be visually perceived as a stereoscopic image, and
the image display section further includes a system control section adapted to control the operation of the television receiver according to the three-dimensional position of the target represented by the position information acquired by the position information acquisition section.

8. A display image control method for controlling binocular parallax images displayed on an image display section adapted to display binocular parallax images, comprising:
acquiring position information representing a three-dimensional position of a target existing in a three-dimensional space on a display surface of the image display section;
acquiring information about a first distance (D1) between a first part of a user and the display surface of the image display section; and
acquiring information about a second distance (D2) between a second part of the user and the display surface of the image display section, in which the second part of the user is different from the first part of the user, and
causing binocular parallax images to be displayed on the image display section according to the three-dimensional position of the target represented by the position information only when one half of D1 is greater than D2.

* * * * *